US005704037A

United States Patent [19]

Chen

[11] Patent Number: 5,704,037
[45] Date of Patent: Dec. 30, 1997

[54] CURSOR POSITIONING DEVICE FOR COMPUTER SYSTEM

[76] Inventor: Mei Yun Chen, Fl., 4, No. 2, Lane 42, Hou Kang St., Shih Lin District, Taipei, Taiwan

[21] Appl. No.: 667,897

[22] Filed: Jun. 20, 1996

[30] Foreign Application Priority Data

Mar. 20, 1996 [CN] China .................. 96103438.6

[51] Int. Cl.$^6$ ........................................... G09G 5/00
[52] U.S. Cl. ........................ 345/184; 345/157; 345/169
[58] Field of Search ........................... 345/184, 156, 345/157, 160, 161, 163, 168, 169; 341/2; 74/471 XY; 178/18, 19

[56] References Cited

U.S. PATENT DOCUMENTS

| | | | |
|---|---|---|---|
| 4,670,743 | 6/1987 | Zemke | 345/168 |
| 5,293,158 | 3/1994 | Soma | 345/161 |
| 5,558,808 | 9/1996 | Hsu | 345/184 |

*Primary Examiner*—Dennis-Doom Chow
*Attorney, Agent, or Firm*—Pro-Techtor International

[57] ABSTRACT

A cursor control device for controlling the movement and positioning of a cursor on a computer includes a finger controllable member formed on the cursor positioning device. The cursor on the display is controllable either in X-axis or Y-axis direction by means of sliding the finger controllable member on the device. The cursor positioning device includes a displacement detecting structure for detecting the movement of the finger controllable member, and photo encoder detectors for detecting the operating situation of the X-axis and Y-axis photo encoders which are arranged in 90 degrees phase deference in space. In such an arrangement, the displacement of the finger controllable member in X-axis and Y-axis direction may be detected as coordinate date. The detected coordinate data is transmitted to a control circuit for further processes and then sent to a computer device.

29 Claims, 38 Drawing Sheets

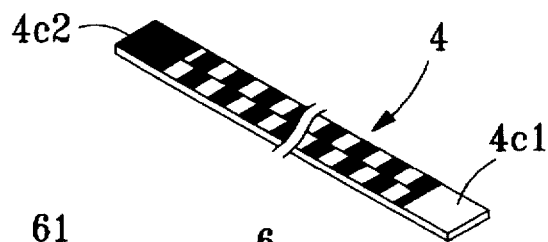
FIG. 20A
FIG. 20B
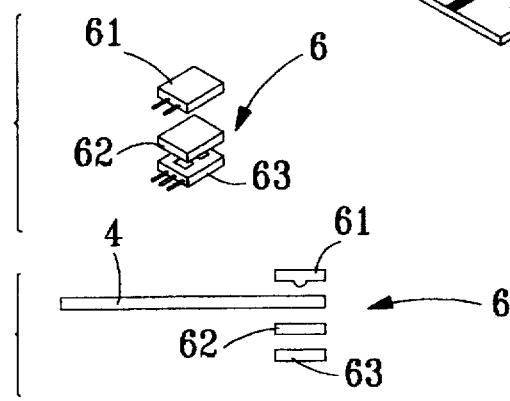
FIG. 20C
FIG. 20D
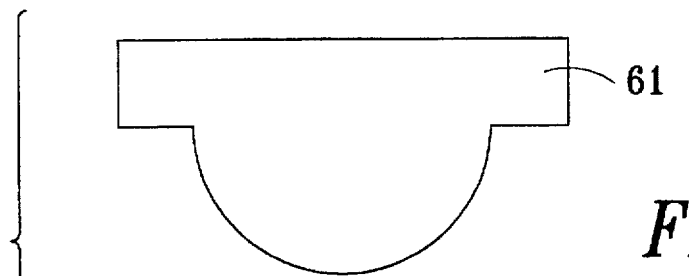
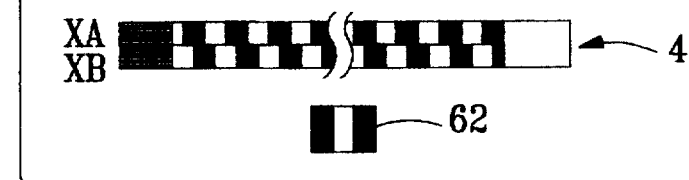
| XA 0010011 | 01100111 |
| XB 0011001 | 00110111 |
| ← Xmin | Xmax → |
FIG. 20E
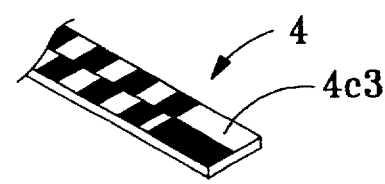
FIG. 20F

CURSOR POSITIONING DEVICE FOR COMPUTER SYSTEM

BACKGROUND OF THE INVENTION

1. Field of the Invention

The present invention relates to a two dimensional data input device for a computer system, and more particularly to a cursor positioning device for controlling the movement and positioning of a cursor on a computer display.

The present invention is a further improved cursor positioning device of my PCT Application Numbers PCTCN950042 and PCTCN950043.

2. Description of the Prior Art

The conventional cursor control devices or cursor positioning devices for a computer monitor include keyboard, mouse, trackball, touch screen, light pen, and so on. These prior art cursor positioning devices are widely used to control the cursor movement and positioning of the cursor or mark on the computer display. Nowadays, these prior art cursor positioning devices are also widely applied to a computer system as a function selection device to simply perform specific function on menus for a computer application program.

However, it is found that these conventional cursor positioning devices are not very convenient in performing the cursor moving operation. For example, the well-known computer keyboard suffers from significant slow performing speed during controlling the cursor movement. It is also noted that the computer mouse is not convenient in cursor movement because the user must move the mouse within a large square area on a mouse pad or a smooth desk by moving his arm repeatedly. In addition, the conventional computer mouse typically includes a downward rotable ball and two encoder wheels to detect the movement of the mouse, which always suffers from contamination, causing poor performance reliability.

In order to overcome the drawbacks found in the conventional cursor positioning devices, "Absolute Axis Coordinate" type computer pointing devices are disclosed in U.S. Pat. No. 4,782,327 and 4,935,728. However, both the prior art U.S. patents have a relatively larger structure size with a complicated control circuit interface and a complicated control procedure to achieve the cursor moving control purpose.

One important problem of the prior art is described below. The typical horizontal resolution of the computer screen may be 640, 800 or 1280 pixels. During slow movement operation mode of the prior art, the cursor on the screen is operated in a pixel-to-pixel operation mode, i.e. fine displacement mode. In case that the finger controllable member of the pointing device moves 320 pixels, the cursor on the screen only moves half of the total traveling distance of the screen or less. At this time, in case that the user changes the operation mode of the pointing device from the initial slow operation mode to a fast movement operation mode, the cursor on the screen will directly jump to the forward margin on the screen or move over 640 pixels. It is to be understood that the prior art has disadvantage of suddenly jumping feature, causing sudden changes operation feeling during moving operation. Because the distance of the cursor movement on the display is equal to a product of a distance of the cursor from an edge of the display area of movement times a quotient of a detected distance of movement of the finger-grippable element divided by a distance of the finger-grippable element from an edge of the pointer area of movement, so that it is possible to get a fraction during operation.

FIG. 12 and FIG. 13 of the U.S. Pat. No. 4,782,327 disclose a movable encoder with mask sections at two margin and a detecting circuit including an integrating circuit and a differentiating circuit. The A, B phase signals of the pointing device has four possible conditions (0,0),(1,0),(1,1),(0,1). If the finger-grippable element stills and not yet reaches a margin, it is possible at (0,0) condition. This will cause incorrect result. Furthermore, when the finger-grippable element reaches a margin, one phase signal is changed while the other phase signal is processed by the integrating circuit and the differentiating circuit based on RC timing method to determine whether the finger-grippable element reaches a margin. Because the finger-grippable element is controlled by operator with different operating speed, the RC timing method will not completely meet the practical requirement in margin determination.

U.S. Pat. No. 4,935,728 has a square opening 136a formed on a top plate 134a of the outer case 132a as shown in FIG. 1. The square opening 136a servers as margin for the finger-grippable element. The photo encoder includes a series of mask sections and transparent sections interleavely. In case the photo encoder with phase A and phase B is required to generate 320 phase signals per inch (not includes the central portion), the minimum distance with a mask section and a transparent section on the photo encoder will be 0.16 mm(25.4 mm/160=0.16 mm). In consideration of the 90 degrees phase difference between the phase A and B, the distance will be equal to 0.08 mm. The narrow displacement nears a maximum tolerant range during operation. Further, when the hardware sends out a pulse signal, it must displace a travel length of 0.08 mm. It will require rather precise movement to generate 320 pixels signal within a distance ranges of 25.4 mm. It is therefore noted that the prior art patent requires precise parallel structure for configuring the square opening and photo encoder in manufacture and assembly. Otherwise, each dot on the square opening in Y-axis direction will have an incorrect X-axis margin value; similarly, each dot on the square opening in X-axis direction will have an incorrect Y-axis margin value.

To match the different resolution of the various display, for example 800*600 or 1280*1204, the following various methods are possible:

1. increasing the size of the finger controllable member; or
2. decreasing the distance between each mask section and transparent section on the photo encoder.

The former method will tire the user due to the length of the finger controllable member is increased, especially the operating range is limited in left and right direction in movement. The second method above will has problem that it can not correctly generate a signal at each moving time because that the distance is decreased causing a small effective displacement. Moreover, it is possible to cause a problem that the pointing device generates two or three pulse signals at each moving time. The design of shorten the distance of photo encoder can reduce the operating ranges of user hand during moving the finger controllable member, and it is especially applicable in use of remote controller for a multi-media system with more convenience and comfort.

The moving speed of the movable photo encoder of the present invention is designed to be proportional to the displacement of the movable photo encoder. So, it is highly possible to control the cursor within a small operating region of 16 mm, by reducing the length of the movable photo encoder, i.e. reducing the operating distance of the finger controllable member, under control of firmware.

Referring to both the plate 66 of the housing shown in FIG. 2 of U.S. Pat. No. 4,782,327 and the movable cover plate 72 shown in FIG. 3 of U.S. Pat. No. 4,935,728, it is required to have a enough length, i.e. two times the distance that the length of the central portion plus travel of the movable photo encoder, so as to cover the square opening. Each side of the operating distance must be three times the distance of the movable photo encoder. So, the required operating region of the plate of the prior art structure must be nine times the traveling area of the movable photo encoder. Further, the photo detector is fixed on the housing so the length of one side of the mechanism must be equal to a length that two times the traveling distance of the movable photo encoder plus the distance of the photo encoder. The area of the mechanism must be four times the traveling distance of the movable photo encoder.

SUMMARY OF THE INVENTION

Consequently, in view of the drawbacks of the prior art cursor control device, the primary object of the present invention is to provide a cursor control device for controlling the positioning and movement of a cursor on a computer screen. The control device is capable of conveniently control the movement of the cursor on the computer screen by using absolute coordinate control technique. In the design of mechanism of the present invention, the photo detector and movable photo encoder, and the whole required operating space are reduced, capable of installing the X-axis and Y-axis movable photo encoder at the same plane to reduce the thickness of the mechanism. This design is especially applicable in known notebook computer. Further, the photo detector may be arranged at the central portion of the mechanism, so it is unnecessary to reserve an square opening on the device, nor to prepare a cover plate to cover the opening. Obviously, the operating space and thickness of the mechanism of the present invention may be reduced in application of installing on a known keyboard or a notebook computer without need of cover plate. The advantages of the present invention are as follows:

1. The mechanism of the present invention has good waterproof and dust-proof effective when associated with a computer keyboard or a notebook computer.
2. The required operating area for the cover can be reduced. The length of the cover plus operating distance is three times that of the finger controllable member. The operating area of the cover is nine times the displacement area of the finger controllable member. The required area of the cursor positioning device of the present invention on the keyboard can be reduced. Particularly, the required area of the movable photo encoder of a preferred embodiment as shown in FIG. 6 can be reduced one ninth of the prior art cover plate.
3. The area of the movable photo encoder can be reduced to half or one forth of the prior art.
4. The movable photo encoder and fixed photo encoder are combined together by a stack structure to generate a series of pulse signals. It is applicable in a fine operation, for example, within a small range of 25.4M/320=0.08 mm, capable of generating 320 pulse signals per dot. In such a small distance, the prior art must use expensive and precise lighting source, such as laser LED, for detecting operation, because the conventional LED has problem of light diffusion during transmitting light beam. The present invention is provided with a fixed calibrating photo encoder, the mask sections and transparent sections of which is designed to correspond to the movable photo encoder and the location of the phases A and B of the photo encoder is arranged to one fourth of a period, so that the photo encoder itself is capable of generating a very precise two phase signals with 90 degrees phase difference. The fixed calibrating photo encoder is preferably attached onto the movable photo encoder to reduce the gap therebetween. Alternatively, the fixed calibrating photo encoder may be directly printed on the movable photo encoder. In such an arrangement, the present invention can use the conventional LED as a lighting source. In effectiveness, the present invention has advantage of simplifying calibrating process, saving time of adjusting the location of the LED, and reducing the components cost.

The conventional mouse has problems of uncertain friction on the X-axis and Y-axis shaft of the encoder, causing error and loss of signal. The movable photo encoder of the present invention has no rotating shaft like the conventional computer mouse, so it can overcome the problem of the conventional mouse.

6. The present invention provides two methods to detect the margin of the finger controllable member. A preferred method to detect the margin is directly formed a margin mark on the movable photo encoder, in order to simply provide a digital form for determination. So, the control procedure is simpler and the manufacturing process is easier than that of prior art.
7. The present invention is provided with margin mark thereon. The movable photo encoder of a preferred embodiment in accordance with the present invention not only has a margin mark, but also has a single lighting source with two phase signals A and B with 90 degrees phase difference. The present invention is possible to be operated within a 16 mm operating area under control of a universal operation mode. In the operation mode, the displacement of the cursor on the display is proportional to that of the finger controllable member. Even when the resolution of the display is changed, the operation mode is still applicable to achieve precise control purpose. Besides, the movement of the cursor is very smooth. No matter where the cursor is moved to any points on the display, it still can get fine displacement around the point where the cursor is located. The present invention also can move the cursor to reach a margin of the display precisely and return to original position fast, under control of the finger controllable member.
8. The location of the cursor on the display may always correspond to the position of the finger controllable member on the cursor positioning device, which can providing a very useful pointing device for the user.
9. The displacement of the cursor on the display is proportional to the distance of the finger controllable member on the cursor positioning device. The moving speed of the cursor on the display also corresponds to the different moving speed of the finger controllable member, resulting a smooth movement of the cursor on the display. So, the present invention can overcome the problem of jumping movement of the cursor as the prior art U.S. Pat. No. 4,935,728.
10. The present invention determine the proportion factor of the displacement of the cursor according to the moving speed increment of the finger controllable member.
11. The present invention can set an effective area, such as within a range of 16 mm or less, for the movement of the finger controllable member. In such a design, it is possible to move the cursor over the whole display area by operating the finger controllable member. So, it can improve the convenience over the prior art, such as a conventional track ball which needs to rotate the ball with various turns during operation to move the cursor over the display.

These and other objects and features of the invention will become more apparent from the following description taken in connection with the accompanying drawings.

BRIEF DESCRIPTION OF THE DRAWINGS

FIGS. 20A to 20F show the structure and associated waveform of a photo detector embodiment using two sets of photo transistors in accordance with the present invention;

FIGS. 22A to 20D show the structure of the photo detector applied to the ninth embodiment of the present invention;

DETAILED DESCRIPTION OF THE PREFERRED EMBODIMENT

Figure 1:
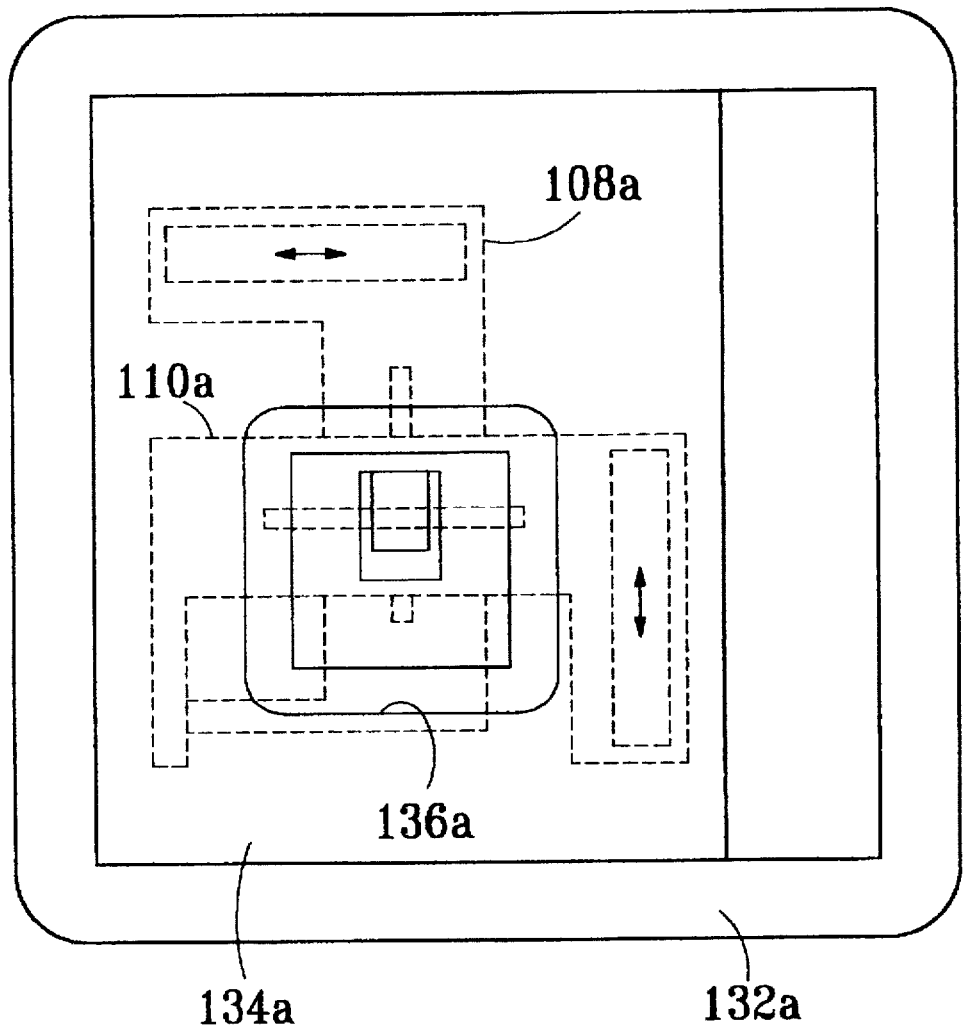
FIG. 1 is a top plan view of the pointing device of prior art.
Figure 2:
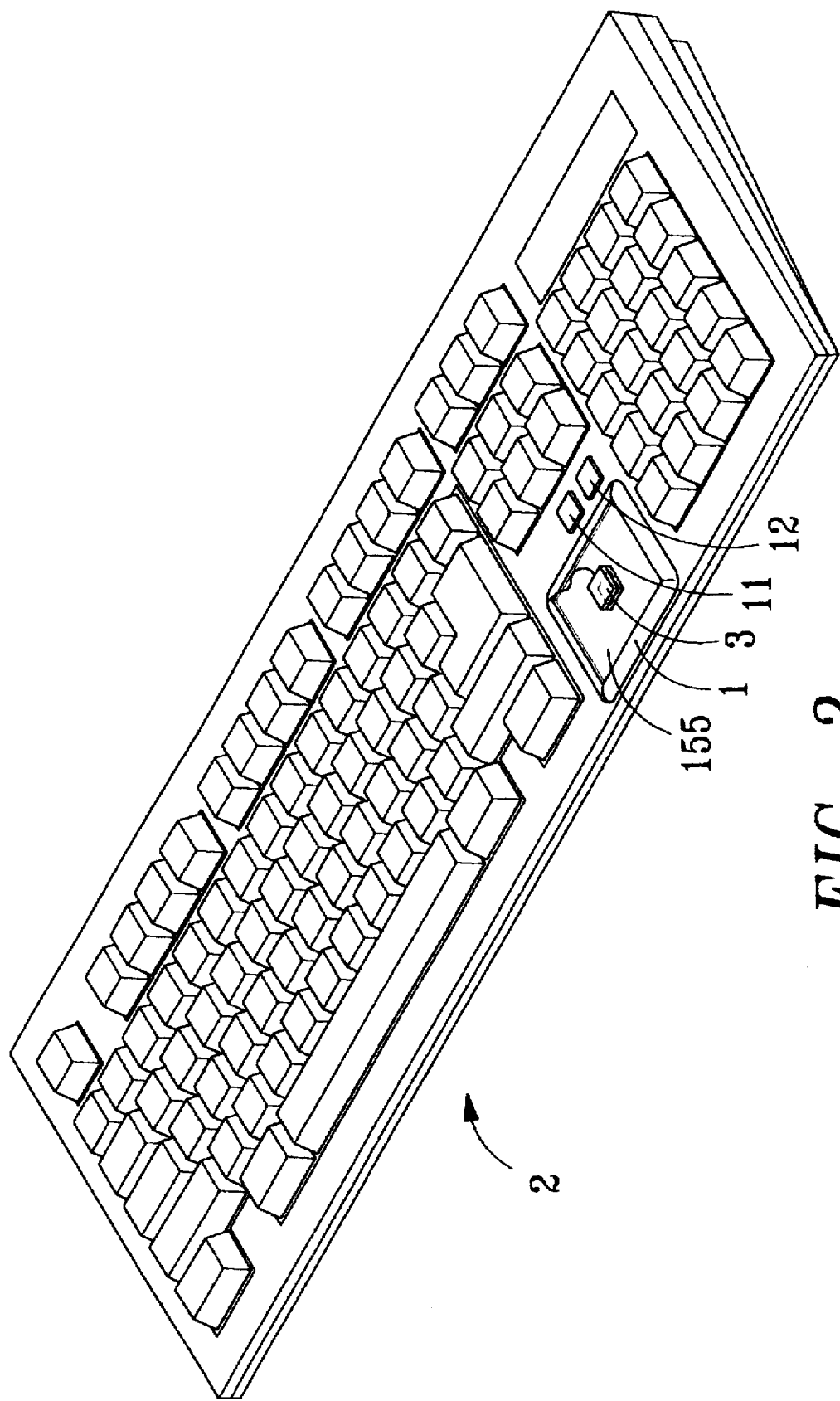
FIG. 2 is a perspective view showing that the cursor positioning device of the present invention may be formed on a known computer keyboard.

As shown in FIG. 2, a cursor positioning device indicated generally at 1 in accordance with one embodiment of the present invention is formed on a well-known computer keyboard 2. It ispossible to mount the cursor positioning device 1 at the other suitable place on the keyboard. In this embodiment, a concave portion 155 is formed on the keyboard. The cursor positioning device 1 includes a finger controllable member 3 which is slidable on the concave portion 155 on the keyboard 2. In addition, alert switch push button 11 and a right switch push button 12 are arranged on the keyboard, next to the concave portion 155, for facilitating data input during operating the finger controllable member 3. The purposes of the concave portion 155 of the keyboard is to limit the slided area of the finger controllable member 3 and act as an effective moving area with waterproof and dust-proof features.

In addition to the assembly embodiment as shown in FIG. 2, the cursor positioning device in accordance with another embodiment of the present invention is possible to be fabricated as an external operated pointing device separated from the keyboard to achieve an easier operating purpose, which will be described below.

Figure 3:
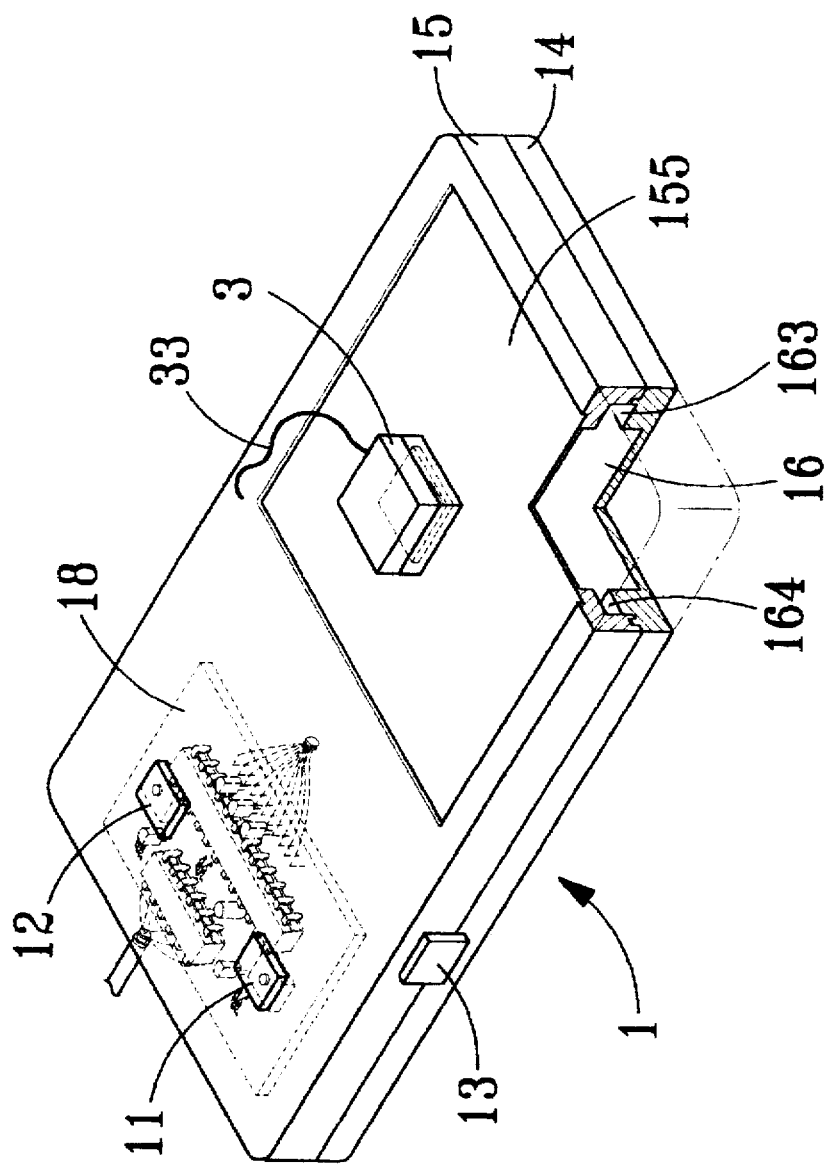
FIG. 3 is a perspective view showing the first embodiment of the cursor positioning device of the present invention.
Figure 4:
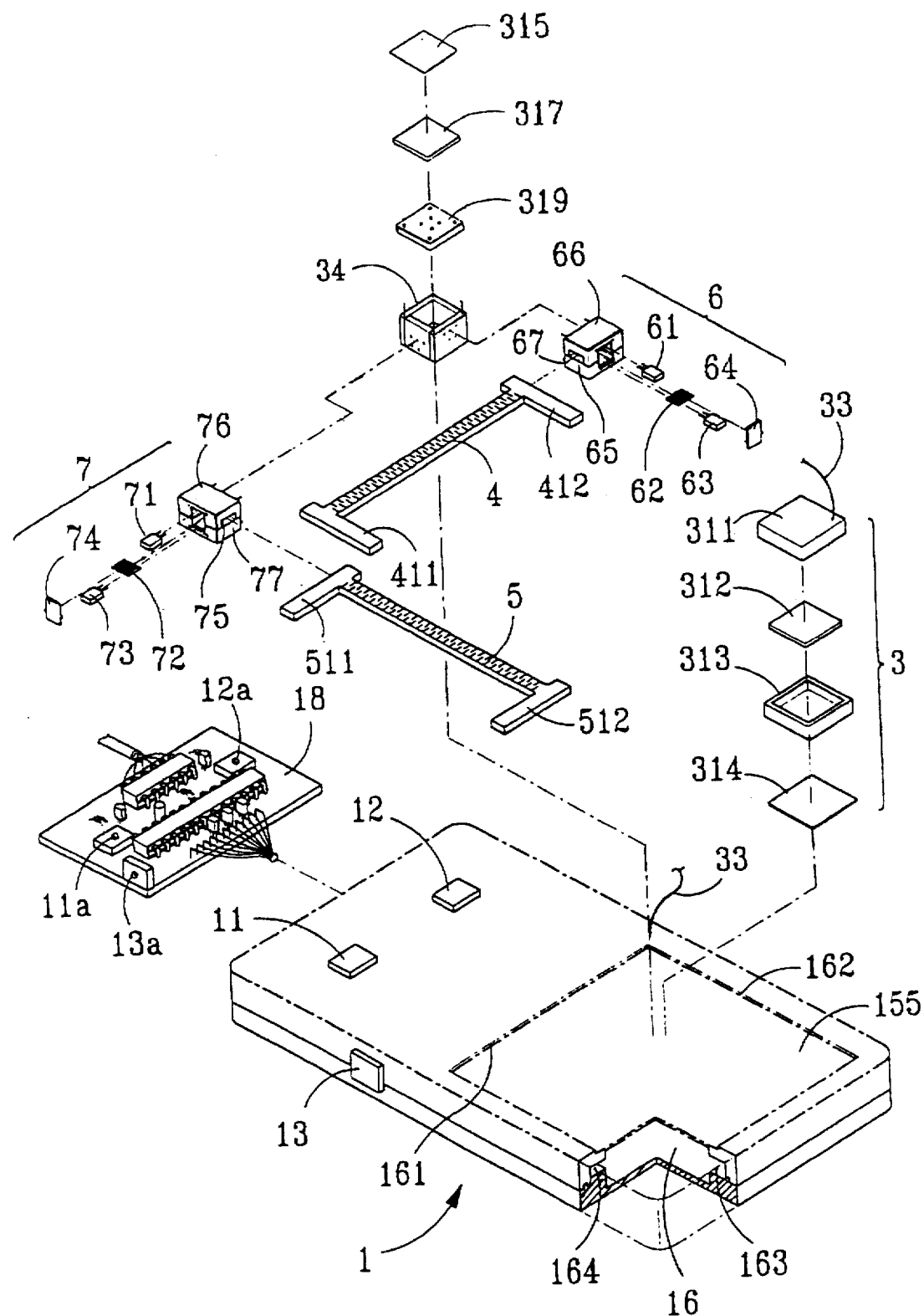
FIG. 4 is an exploded view of the embodiment shown in FIG. 3.

FIG. 3 shows a perspective view of the cursor positioning device in accordance with the first embodiment of the present invention. FIG. 4 shows the exploded view of the cursor positioning device shown in FIG. 3. In this embodiment, the cursor positioning device 1 includes a lower housing 14 and an upper housing 15, so that an inner space 16 is formed therebetween. A finger controllable member 3 is slidable on a concave portion 155 integratedly formed on the top surface of the upper housing 15. Preferably, a fasten wire 33 is provided to bond together the finger controllable member 3 with the upper housing 15 so as to prevent the finger controllable member from dropping. The cursor positioning device 1 is provided with three push buttons 11, 12, and 13 thereon.

As shown in FIG. 4, the finger controllable member 3 includes a cover member 311, a magnetic member 312, and a bottom member 313. A smooth member 314 is further attached to the bottom surface of the bottom member 313 to enable the finger controllable member 3 to move more smoothly on the concave portion 155 of the upper housing 15.

An inside slidable member 34 is arranged within the inner space 16 of the cursor positioning device 1, which is provided with a smooth member 315, a magnetic member 317, and a cover member 319. When the user moves the finger controllable member 3 on the square area of the concave portion 155 of the upper housing 15, the inside slidable member 34 moved correspondingly by means of magnetic force between the magnetic members 312 and 317.

The inside slidable member 34 is attached with a X-axis photo detector 6 and a Y-axis photo detector 7 on its side walls. The X-axis photo detector 6 includes an upper case 66 and a lower case 67, and therefore a recess 65 is formed therebetween. A X-axis movable photo encoder 4 may be inserted into the recess 65 of the X-axis photo detector 6 and slidable therethrough. In the X-axis photo detector 6, there are mounted with a LED 61, a calibrating photo encoder 62, a photo transistor 63, and a cover plate 64. The Y-axis photo detector 7 includes an upper case 76 and a lower case 77, and therefor a recess 75 is formed therebetween. A Y-axis photo encoder 5 may be inserted into the recess 75 and slidable therethrough. In the Y-axis photo detector 7, there are mounted with a LED 71, a calibrating photo encoder 72, a photo transistor 73, and a cover plate 74.

The X-axis photo encoder 4 is also slidable in the inner space 16 along the opposite guide slots 161 and 163 by means of opposite guide extensions 411 and 412. The Y-axis photo encoder 5 is slidable in the inner space 16 along the opposite guide slots 162 and 164 by means of opposite guide extensions 511 and 512.

A printed circuit board 18 is mounted in the cursor positioning device 1 with a left switch 11a, a right switch 12a, and a middle switch 13a, controllable by three corresponding switch push buttons 11, 12, and 13 mounted on the upper housing.

The advantages of this embodiment only requires a small installation space. The top surface of the upper housing has no moving member except for the finger controllable member, so that it has excellent isolation and prevention of contamination. Besides, the inside slidable member within the inner space of the device is moved by means of magnetic force, so that the structure is simple and the operation is convenient.

The printed circuit board 16 of the device 1 is provided with a data communication circuit, such as a well-known RS232 serial communication interface, for performing data communication with a computer system. The three push buttons 11, 12, and 13 serve as function control keys like the functions of the control buttons on a computer mouse.

Figure 5:
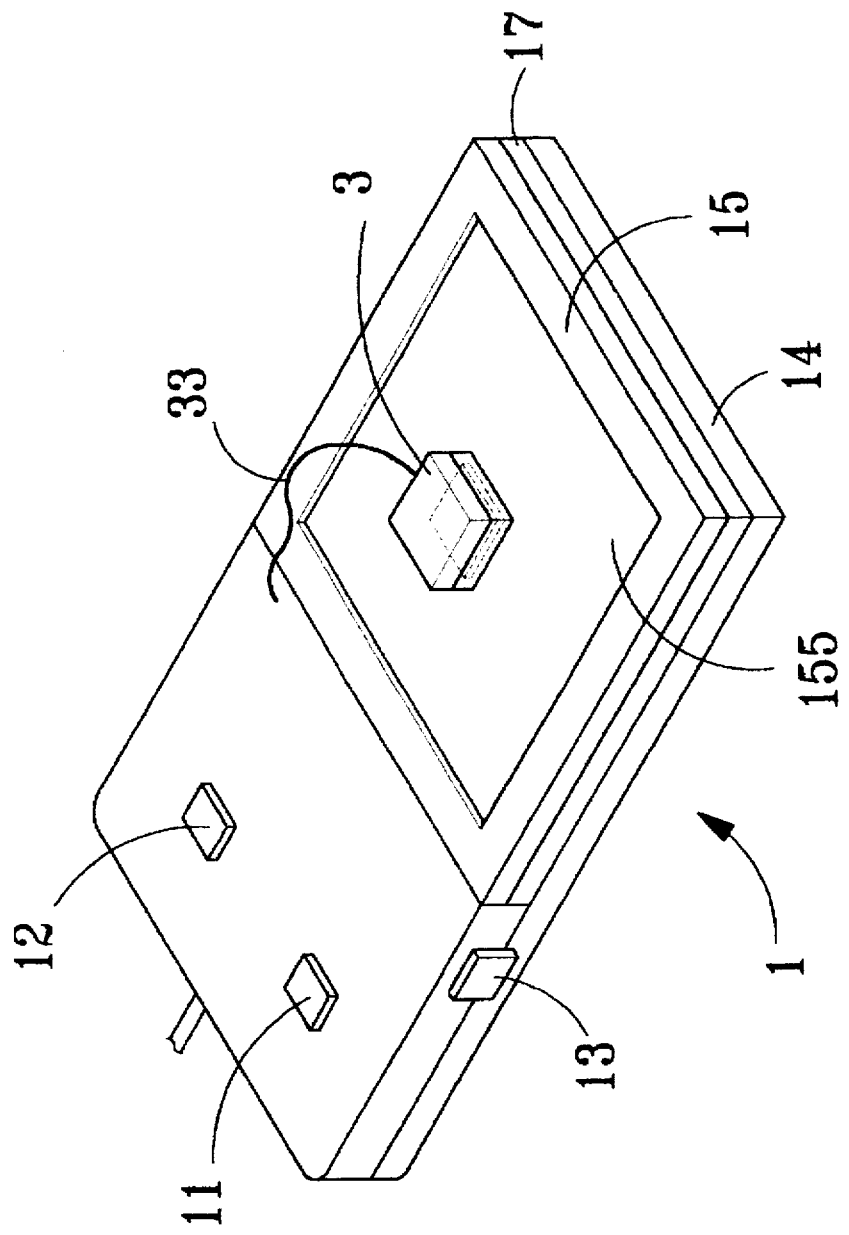
FIG. 5 is a perspective view showing the second embodiment of the cursor positioning device of the present invention.
Figure 6:
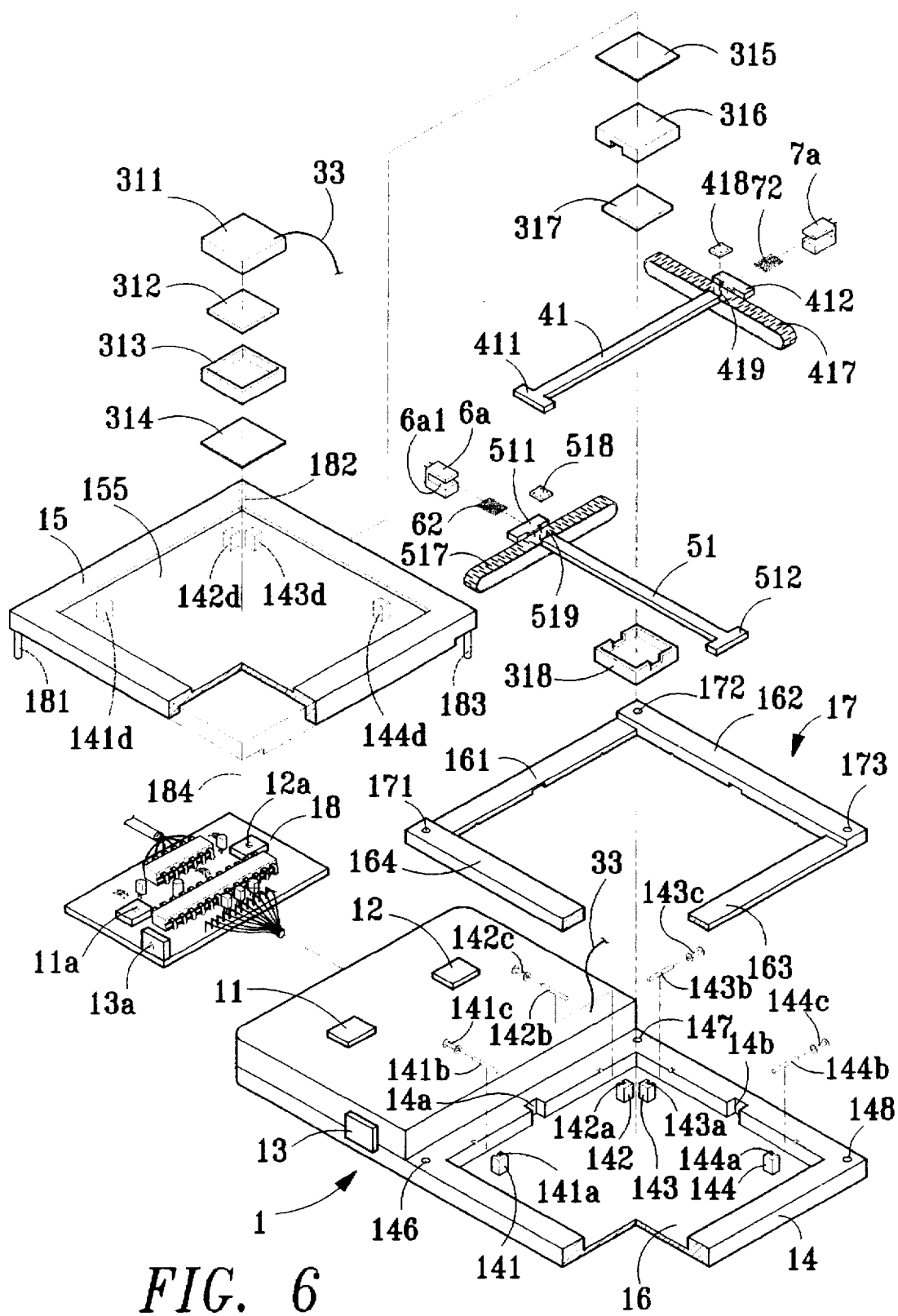
FIG. 6 is an exploded view of the embodiment shown in FIG. 5.

FIG. 5 shows a perspective view of the cursor positioning device in accordance with the second embodiment of the present invention. FIG. 6 shows the exploded view of the cursor positioning device shown in FIG. 5. The same reference numbers will be used throughout the drawings to refer to the same or like parts of the previous embodiment.

In this embodiment, a frame 17 is further provided between the lower housing 14 and the upper housing 15, having through holes 171, 172, and 173 at the respective corner thereof. The upper housing 15 is provided with four insert pins 181, 182, 183, and 184 capable of inserting into the corresponding small holes 146, 147, and 148 formed on the lower housing 14 via the through holes 171,172, and 173 of the frame 17 respectively, so as to fix the frame 17 in position between the upper housing 15 and the lower housing 14.

The opposite bars 161 and 163 of the frame act as Y-axis guide rail for the Y-axis slidable bar 51, and the other opposite bars 162 and 164 of the frame act as X-axis guide rail for the X-axis slidable bar 41. A X-axis flexible encoder 417 is jointed at its two ends by a rivet plate 418 on a concave portion 419 of the X-axis slidable bar 41, as shown in FIG. 6. Similarly, a Y-axis flexible encoder 517 is jointed at its two ends by a rivet plate 518 on a concave portion 519 of the Y-axis slidable bar 51. The X-axis flexible encoder 417 is arranged to surround two rollers 143c and 144c which are supported by fixed pins 143b and 144b respectively. The fixed pins 143b and 144b are suspended on the pivotal slots 143a and 144a formed on upward stands 143 and 144 of the lower housing 14 respectively. Similarly, The Y-axis flexible encoder 517 is arranged to surround two rollers 141c and 142c which are supported by fixed pins 141b and 142b respectively. The fixed pins 141b and 142b are suspended on the pivotal slots 141a and 142a formed on upward stands 141 and 142 of the lower housing 14 respectively. The upper housing 15 is further provided with various downward stands 141d, 142d, 143d, and 144d corresponding to the upward stands 141, 142, 143, and 144 respectively to serve as pivot member for the fixed pins 141b, 142b, 143b, and 144b.

A photo detector 6a with a calibrating photo encoder 62 is arranged to detect the rotation of the flexible encoder 517, which may be mounted in a recess 14a of the lower housing 14. Another photo detector 7a with a calibrating photo encoder 72 is arranged to detect the rotation of the flexible encoder, 417, which may be mounted in a recess 14b perpendicular to the recess 14a of the lower housing 14.

By moving the finger controllable member 3 consisting of a cover member 311, a magnetic member 312, a bottom member 313, and a smooth member 314 on the concave portion 155 of the upper housing 15, the inside slidable member consisting of a smooth member 315, a magnetic member 317, and a bottom member 318 can be moved correspondingly within the inner space 16 of the cursor positioning device 1 by means of the magnetic force between the magnetic members 312 and 317. So, the X-axis slidable bar 41 and the Y-axis slidable bar 51 can move within the inner space 16 of the device 1 according to the movement of the controllable member. The movement of the slidable bars 41 and 51 either in X-direction or Y-direction will be detected by the photo detectors 6a and 7a, and the detected movement signal will be transmitted to the control circuit on the printed circuit board 18.

This embodiment has advantage of effectively saving installation space due to the encoders 417 and 517 thereof is arranged in a flat and circular form. Obviously, this embodiment further improves the first embodiment described above with smaller product size. Predictively, this embodiment can save about 3 fourth operational space required by the encoder.

Figure 7:
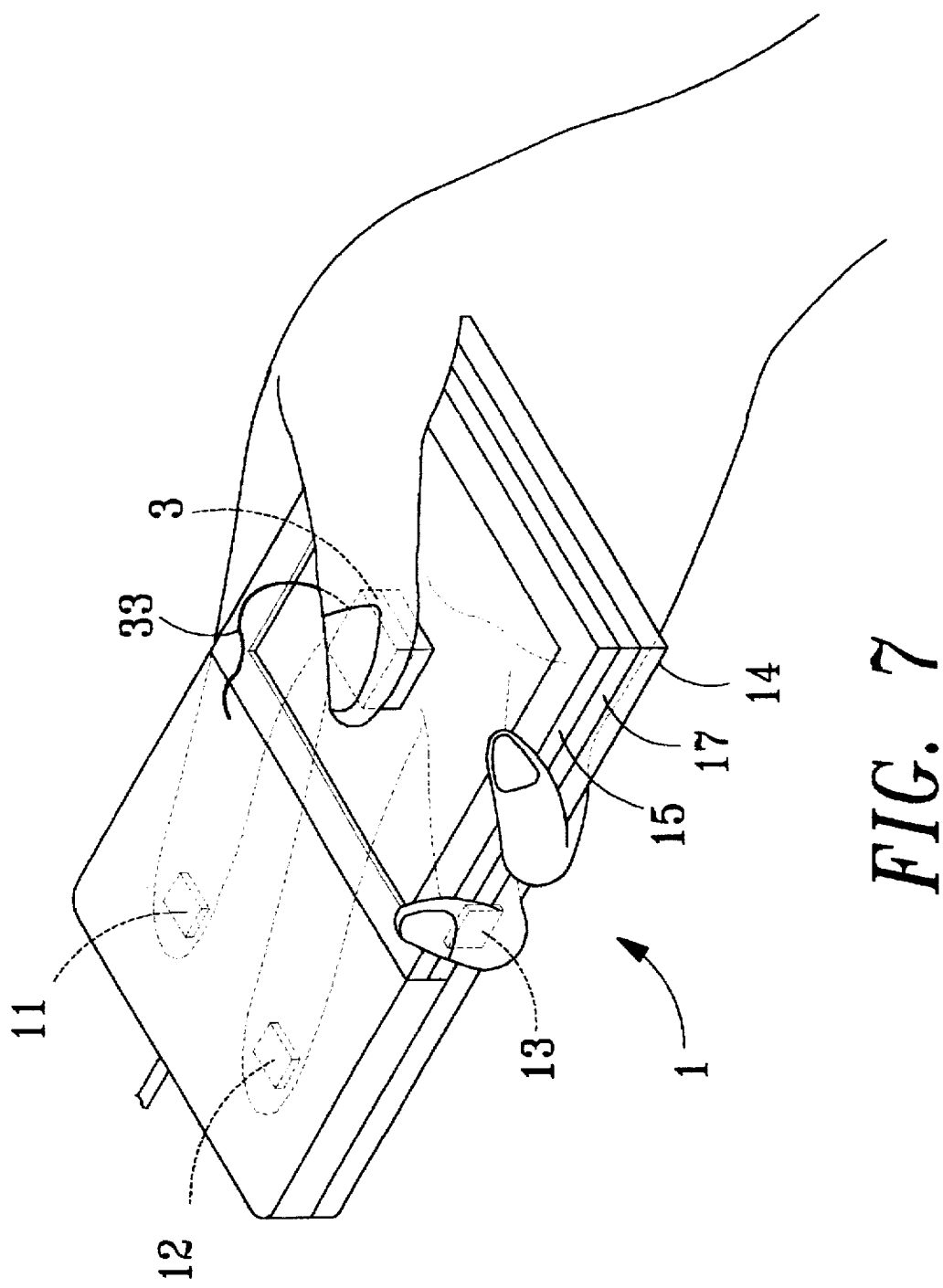
FIG. 7 is a perspective view showing the third embodiment of the cursor positioning device of the present invention held by a hand of operator.
Figure 8:
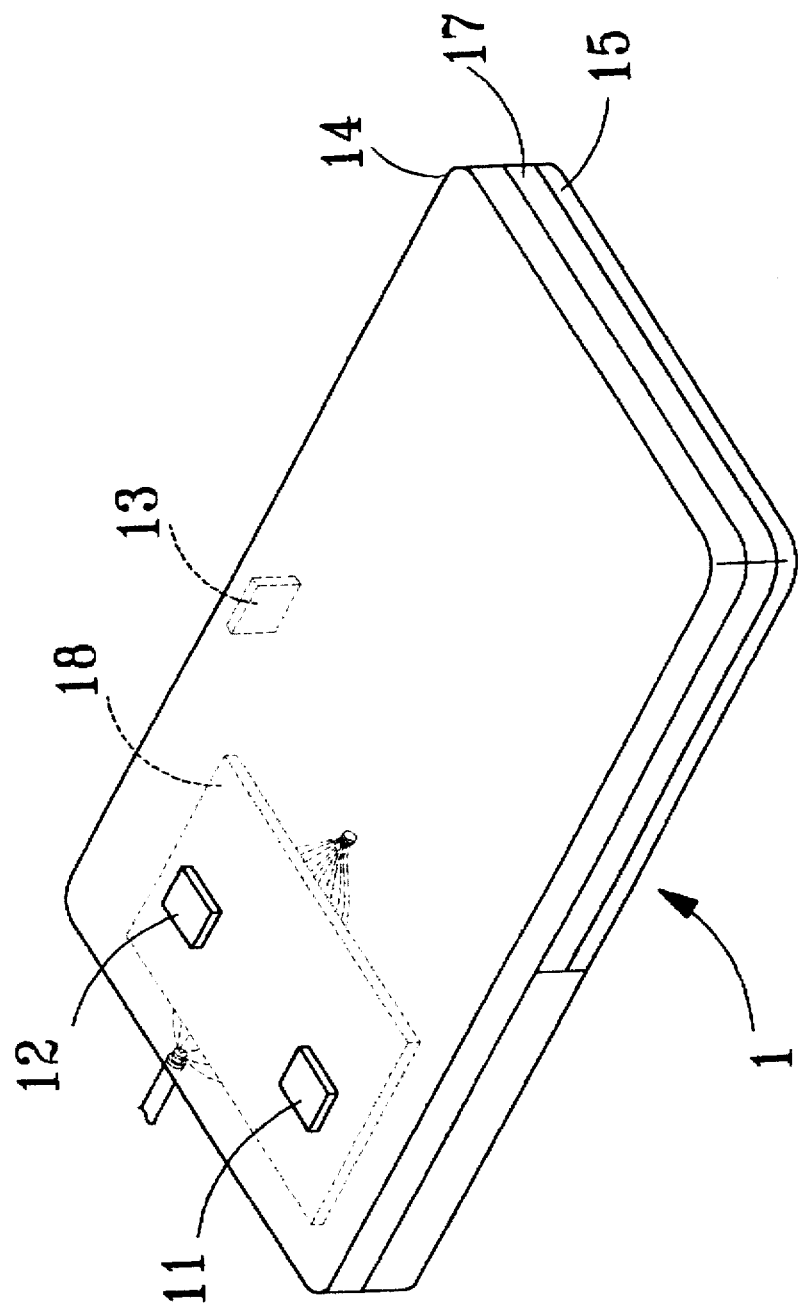
FIG. 8 is a perspective bottom view of the cursor positioning device shown in FIG. 7.

FIG. 7 shows a perspective view of the cursor positioning device held by a user's hand in accordance with the third embodiment of the present invention. FIG. 8 shows the bottom view of the cursor positioning device shown in FIG. 7. In this embodiment, the left switch push button 11 and the right switch push button 12 are arranged on the bottom surface of the lower housing 14, which are conveniently controllable by the index-finger and middle finger of the user respectively. A middle switch push button 13 is arranged on side wall of the housing, controllable by ring finger of the user. The user can move the finger controllable member 3 by thumb finger for moving the cursor on the computer display.

The arrangement of this embodiment meets the requirements of economics, facilitating the user to hold and operate the device by single hand, especially suitable to be applied to seminar. In this manner, the user may control the cursor positioning device by either hold it as a remote controller or place it on desk To satisfy this requirement, the cursor positioning device may use known wireless control technique, such as infrared ray or radio frequency transmission, for data communication.

Figure 9:
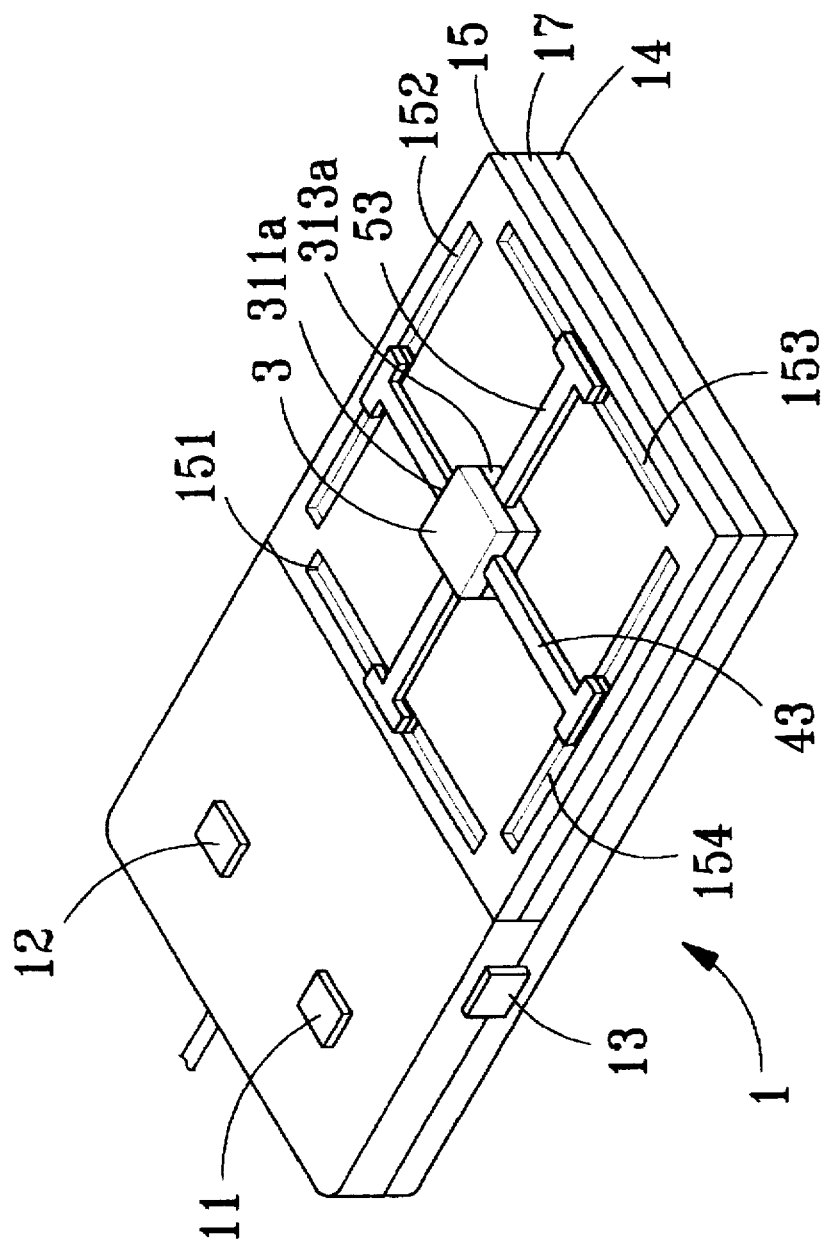
FIG. 9 is a perspective view showing the forth embodiment of the cursor positioning device of the present invention.
Figure 10:
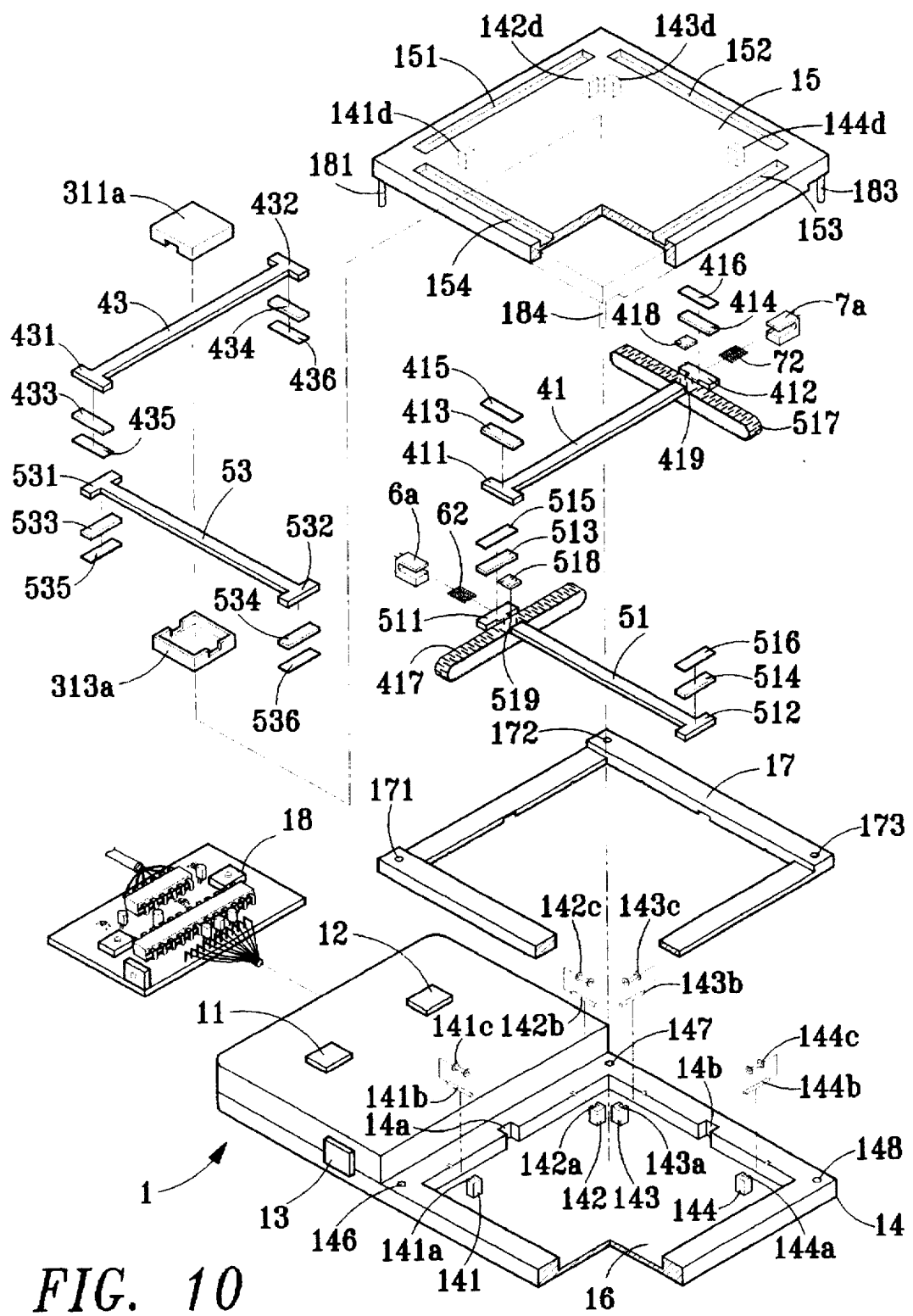
FIG. 10 is an exploded view of the embodiment shown in FIG. 9.

FIG. 9 shows a perspective view of the cursor positioning device in accordance with the forth embodiment of the present invention. FIG. 10 shows the exploded view of the cursor positioning device shown in FIG. 9. The structure of this embodiment is similar to the second embodiment as shown in FIG. 6, except that the upper housing 15 is provided with two X-axis guide slots 152 and 154, and two Y-axis guide slots 151 and 153. A X-axis slidable bar 43 is slidable along the guide slots 152 and 154, and a Y-axis slidable bar 53 is slidable along the guide slots 151 and 153, by means of moving the finger controllable member 3. The finger controllable member 3 is composed of an upper case 311a and a lower case 313a for moving the slidable bars 43 and 53 either in X-direction or Y-direction movement.

The X-axis slidable bar 43 is provided with two guide extensions 431 and 432 at two opposite ends thereof. A magnetic member 433 and a smooth member 435 are attached to the bottom surface of the guide extension 431 in sequence, and a magnetic member 434 and a smooth member 436 are attached to the bottom surface of the guide extension 432 in sequence. Correspondingly, the X-axis slidable bar 41 is provided with two guide extensions 411 and 412 at two opposite ends thereof. A magnetic member 413 and a smooth member 415 are attached to the top surface of the guide extension 411 in sequence, and a magnetic member 414 and a smooth member 416 are attached to the top surface of the guide extension 412 in sequence. In such an arrangement, the X-axis slidable bar 43 may be slided along the X-axis guide slots 152 and 154 when the user moves the finger controllable member 3 in X-direction, causing the X-axis slidable bar 41 moves and the flexible encoder 417 is rotated in response to the moving direction of the finger controllable member 3, by means of the magnetic force. A photo detector 7a with a calibrating photo encoder 72 is arranged to detect the rotation of the flexible encoder 517. The detected rotation signal will be transmitted to the control circuit board 18 for further processes.

Similarly, the Y-axis slidable bar 53 is provided with two guide extensions 531 and 532 at two opposite ends thereof. A magnetic member 533 and a smooth member 535 are attached to the bottom surface of the guide extension 531 in sequence, and a magnetic member 534 and a smooth member 536 are attached to the bottom surface of the guide extension 532 in sequence. Correspondingly, the Y-axis slidable bar 51 is provided with two guide extensions 511 and 512 at two opposite ends thereof. A magnetic member 513 and a smooth member 515 are attached to the top surface of the guide extension 511 in sequence, and a magnetic member 514 and a smooth member 516 are attached to the top surface of the guide extension 512 in sequence. In such an arrangement, the Y-axis slidable bar 53 may be slided along the Y-axis guide slots 151 and 153 when the user moves the finger controllable member 3 in Y-direction, causing the Y-axis slidable bar 51 moves and the flexible encoder 517 is rotated in response to the moving direction of the finger controllable member 3, by means of the magnetic force. A photo detector 6a with a calibrating photo encoder 62 is arranged to detect the rotation of the flexible encoder 417. The detected rotation signal is also transmitted to the control circuit board 18 for further processes.

Figure 11:
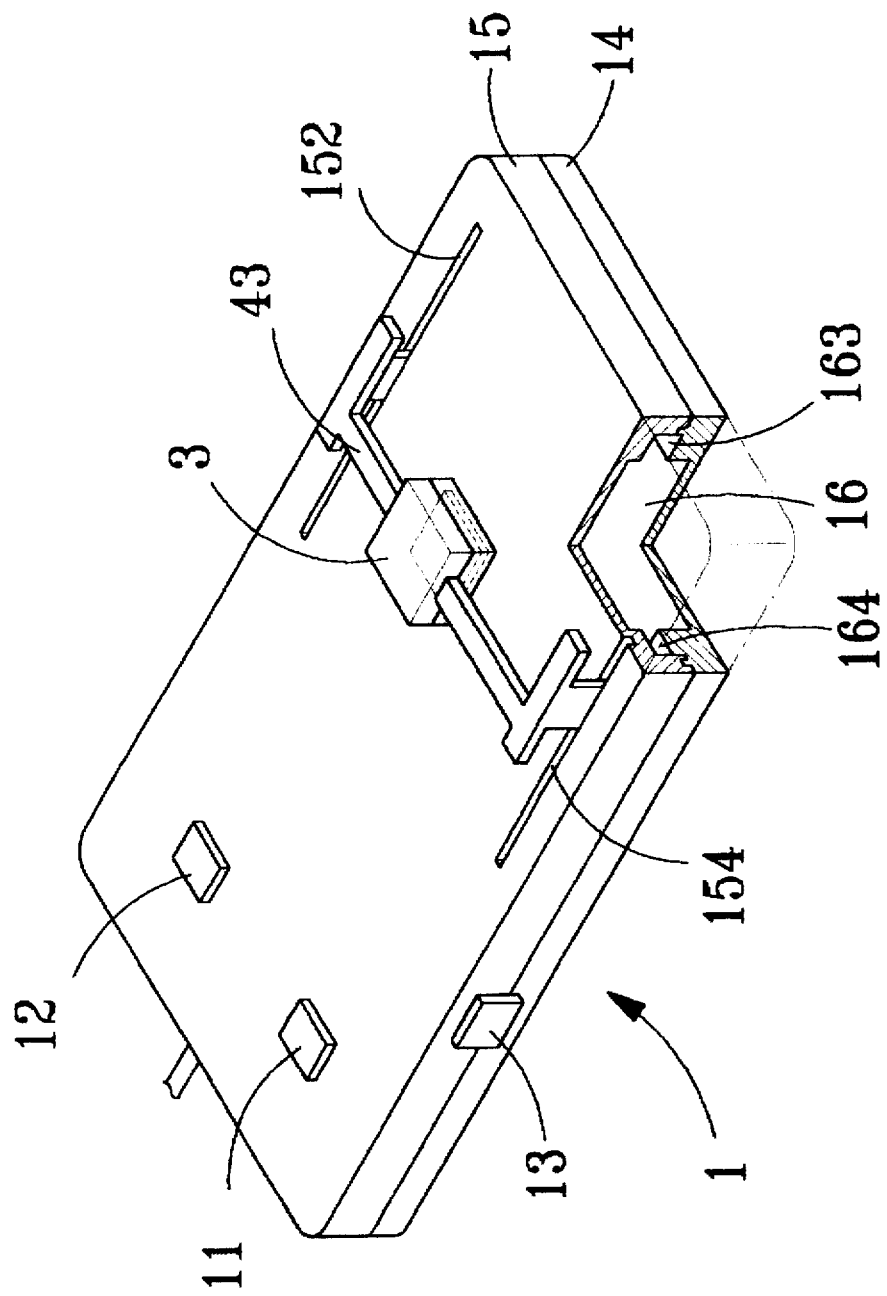
FIG. 11 is a perspective view showing the fifth embodiment of the cursor positioning device of the present invention.
Figure 12:
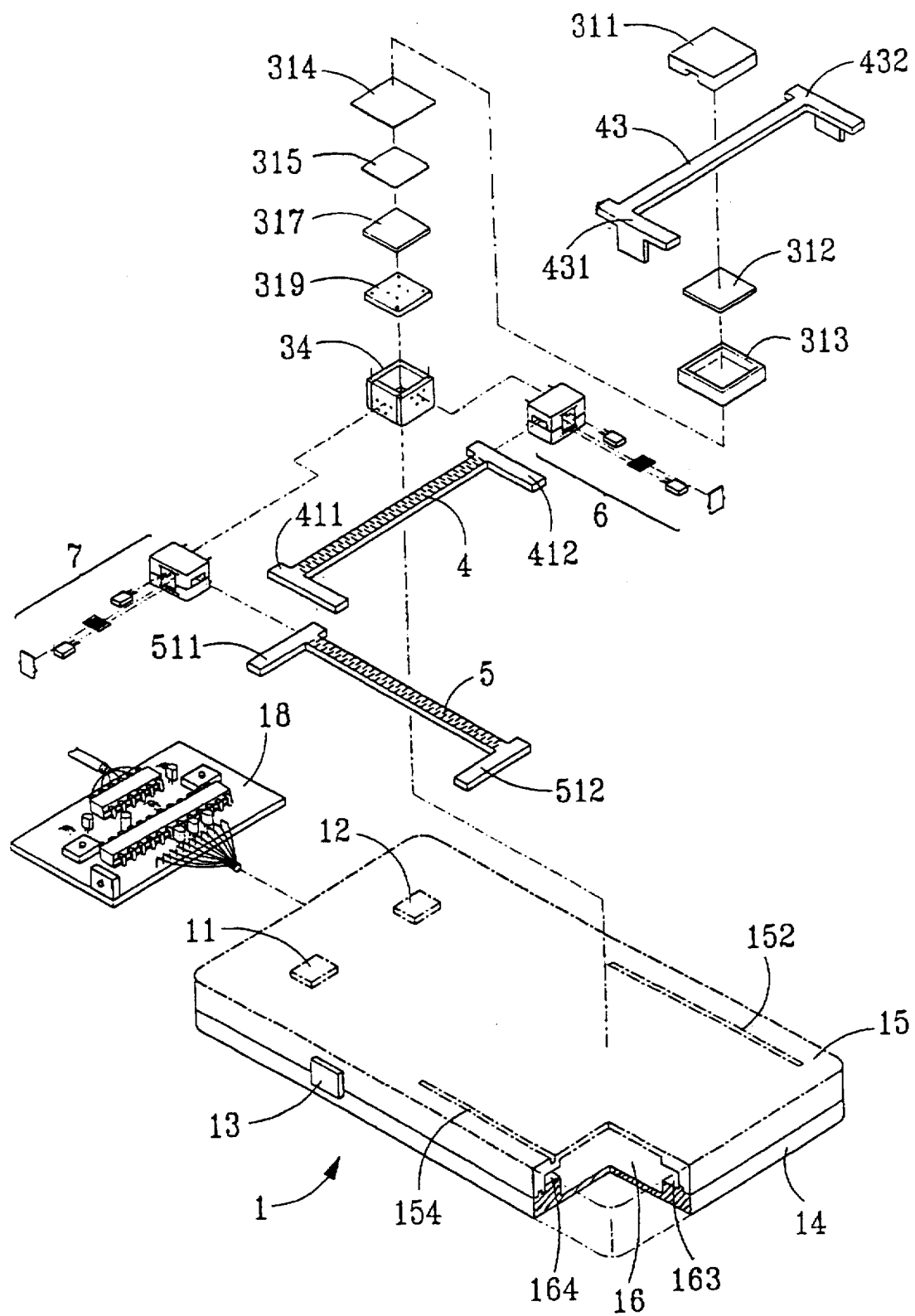
FIG. 12 is an exploded view of the embodiment shown in FIG. 11.

FIG. 11 shows a perspective view of the cursor positioning device in accordance with the fifth embodiment of the present invention. FIG. 11 shows the exploded view of the cursor positioning device shown in FIG. 11. The structure of this embodiment is similar to the first embodiment as shown in FIG. 3, except that the upper housing 15 is provided with two U-shaped guide slots 152 and 154. A X-axis slidable bar 43 is slidable along the U-shaped guide slots 152 and 154 by means of moving the finger controllable member 3. The finger controllable member 3 is composed of an upper case 311, a magnetic member 312, a lower case 313, and a smooth member 314, capable of moving the slidable bar 43 in X-direction and moving along the slidable bar 43 in Y-direction.

An inside slidable member 34 is arranged within the inner space 16 of the cursor positioning device 1, which is provided with a smooth member 315, a magnetic member 317, and a cover member 319. When the user moves the finger controllable member 3 on the top surface of the upper housing 15, the inside slidable member 34 is moved in response to the movement of the finger controllable member 3, by means of magnetic force between the magnetic members 312 and 317. A X-axis photo detector 6 may detect the movement of the X-axis photo encoder 4, and a Y-axis photo detector 7 may detect the movement of the Y-axis photo encoder 5. The detected movement signal is transmitted to the control circuit board 18 for further processes.

This embodiment has advantage of a rather simple structure, because only a X-axis slidable bar 43 and a finger controllable member 3 are arranged on the upper housing, and the inside slidable member 34 is moved by means of magnetic force.

Figure 13:
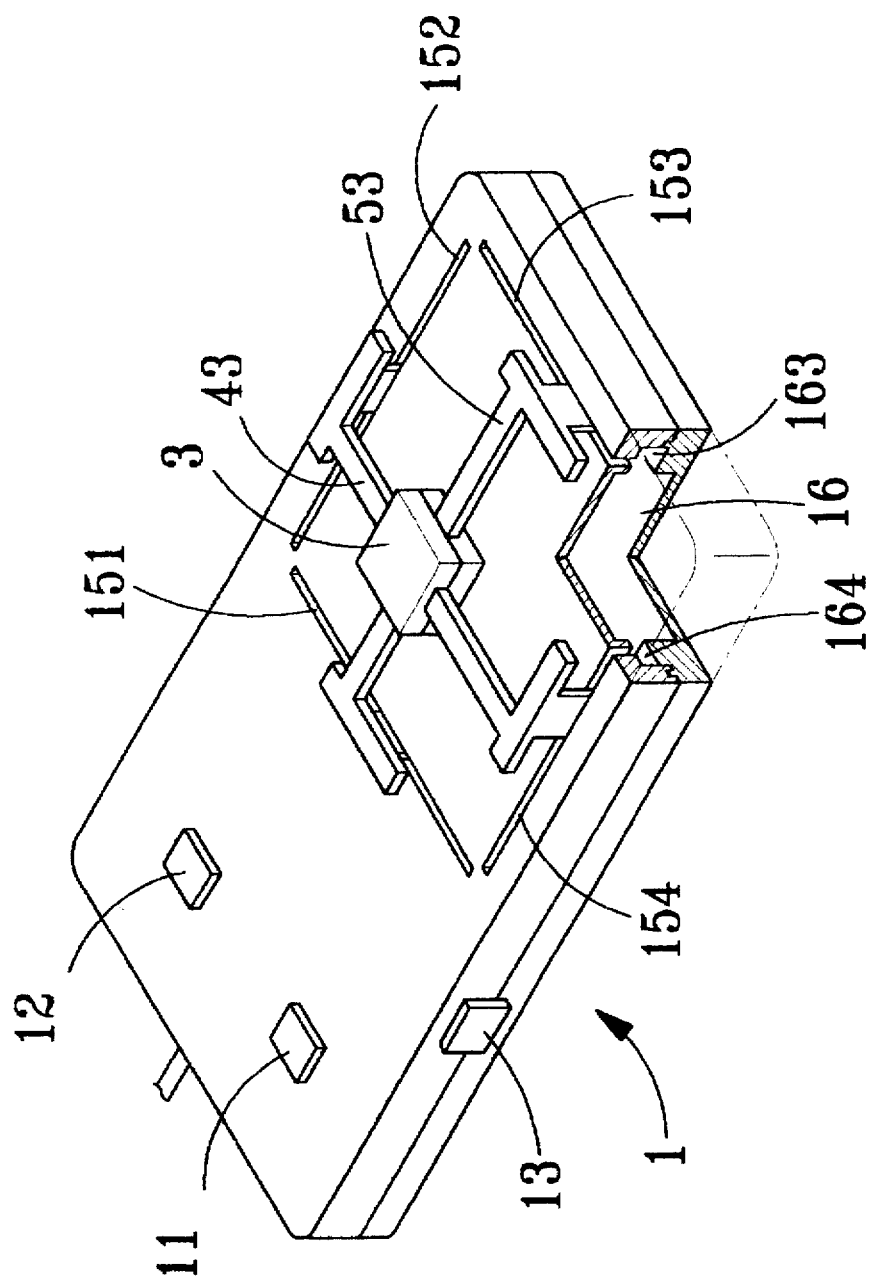
FIG. 13 is a perspective view showing the sixth embodiment of the cursor positioning device of the present invention.
Figure 14:
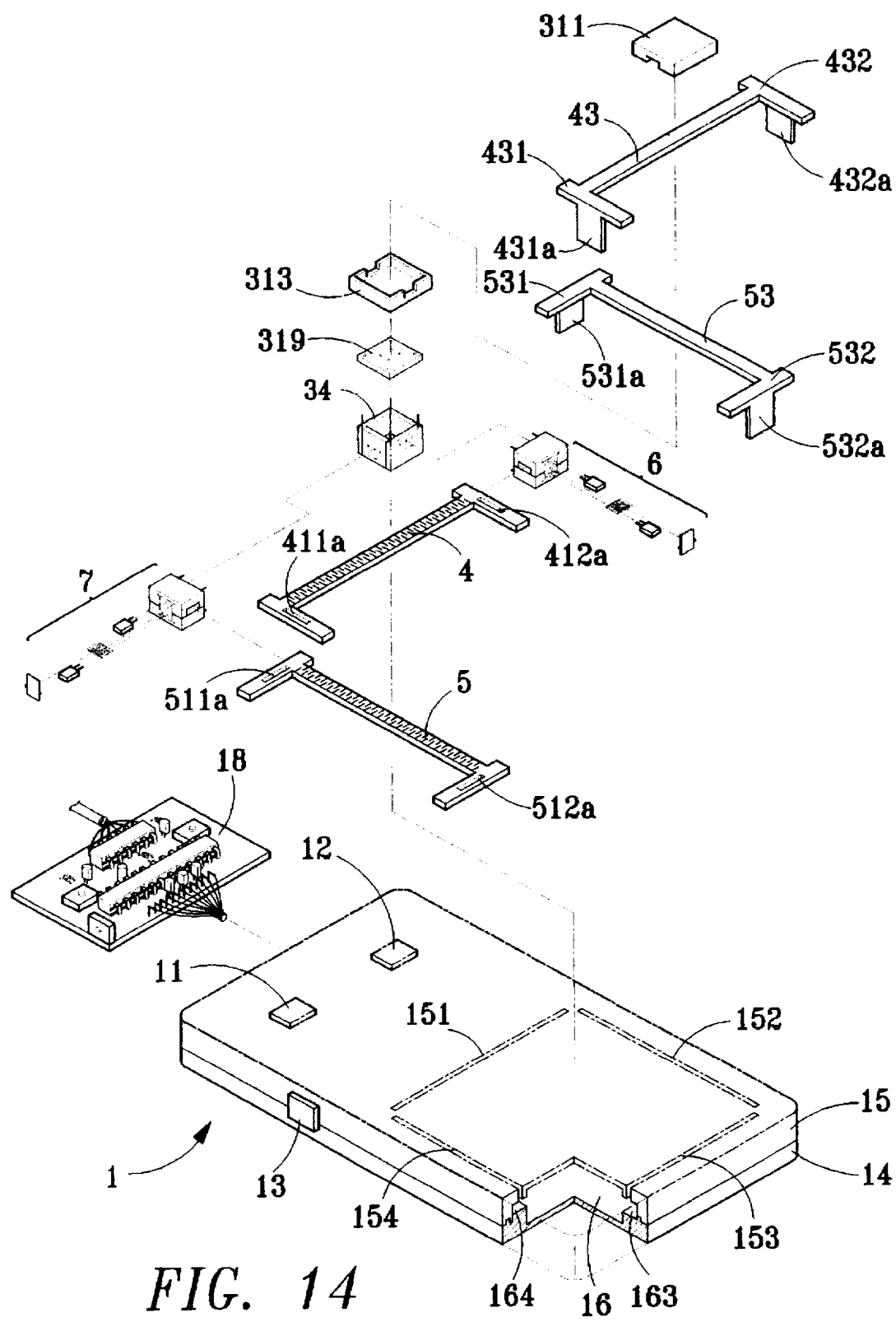
FIG. 14 is an exploded view of the embodiment shown in FIG. 13.

FIG. 13 shows a perspective view of the cursor positioning device in accordance with the sixth embodiment of the present invention. FIG. 14 shows the exploded view of the cursor positioning device shown in FIG. 13. The structure of this embodiment is similar to the fifth embodiment as shown in FIG. 11, except that the upper housing 15 is provided with two X-axis guide slots 152 and 154, and two Y-axis guide slots 151 and 153. The X-axis slidable bar 43 is provided with two opposite transverse plates 431 and 432 at two ends. Further, the transverse plate 431 is integratedly formed with a downward mounting plate 431a, and the transverse plate 432 is integratedly formed with a downward mounting plate 432a. The transverse plates 431 and 432 are designed to be suitable to mounted into the through slots 411a and 412a formed at two ends of the X-axis photo encoder 4 respectively. Similarly, the Y-axis slidable bar 53 is provided with two opposite transverse plates 531 and 532 at two ends. The transverse plate 531 is integratedly formed with a downward mounting plate 531a, and the transverse plate 532 is integratedly formed with a downward mounting plate 532a. The transverse plates 531 and 532 are designed to be suitable to mounted into the through slots 511a and 512a formed at two ends of the Y-axis photo encoder 5 respectively. In such an arrangement, the X-axis slidable bar 43 and the Y-axis slidable bar 43 may directly move the X-axis photo encoder 4 and the Y-axis photo encoder 5 respectively when operating the finger controllable member 3.

The movement of the photo encoder 4 and 5 may be detected by the photo detectors 6 and 7 respectively mounted on side walls of the inside slidable member 34, and the detected movement signal is transmitted to the control circuit board 18 for further processes.

Figure 15:
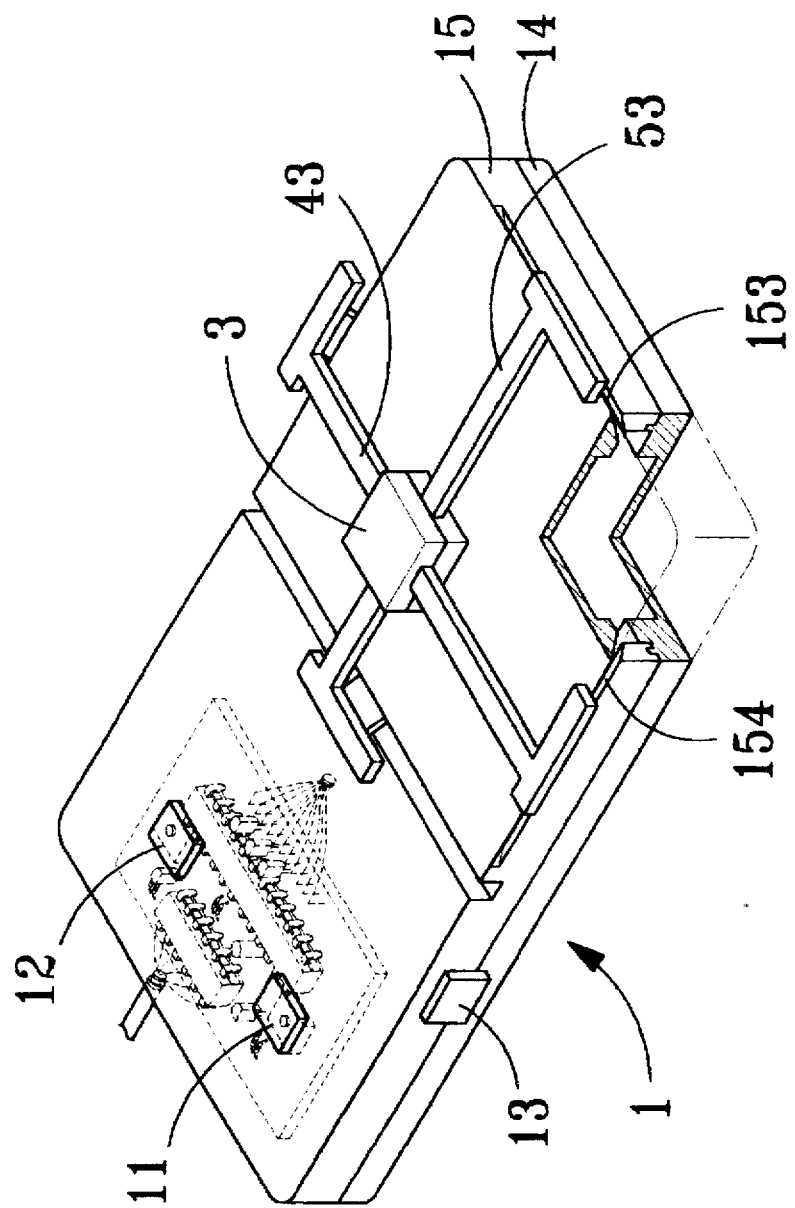
FIG. 15 is a perspective view showing the seventh embodiment of the cursor positioning device of the present invention.

FIG. 15 shows a perspective view of the cursor positioning device in accordance with the seventh embodiment of the present invention. The structure of this embodiment is similar to the sixth embodiment as shown in FIG. 13, except that the guide slots 151, 152, 153, and 154 formed on the upper housing 15 are in a form of sloping structure, preferably at a outward slope of 45 degrees. Correspondingly, the downward mounting plates formed on the slidable bars 43 and 53 are in a form of inward sloping structure to match the sloping structure of the guide slots. The purpose of the sloping structure of the guide slots may get a better waterproof and dust-proof effect.

Figure 16:
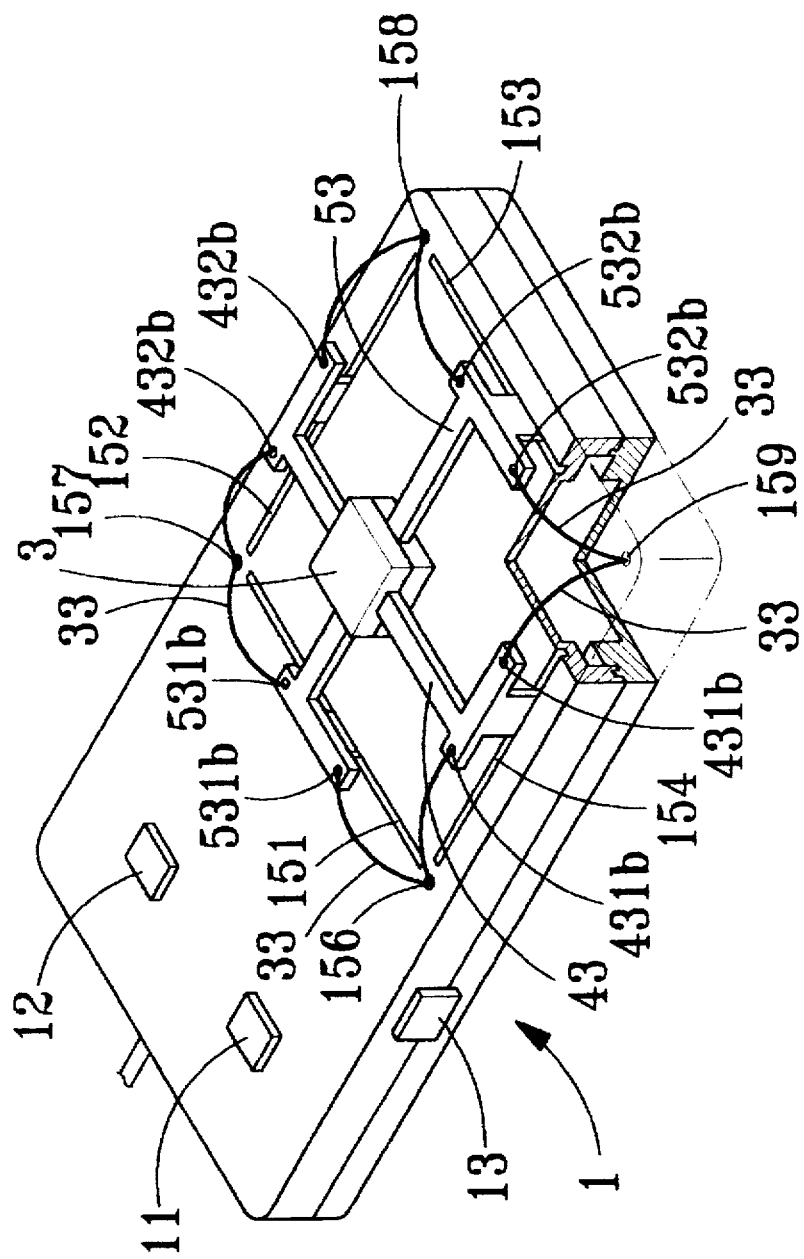
FIG. 16 is a perspective view showing the eighth embodiment of the cursor positioning device of the present invention.
Figure 17:
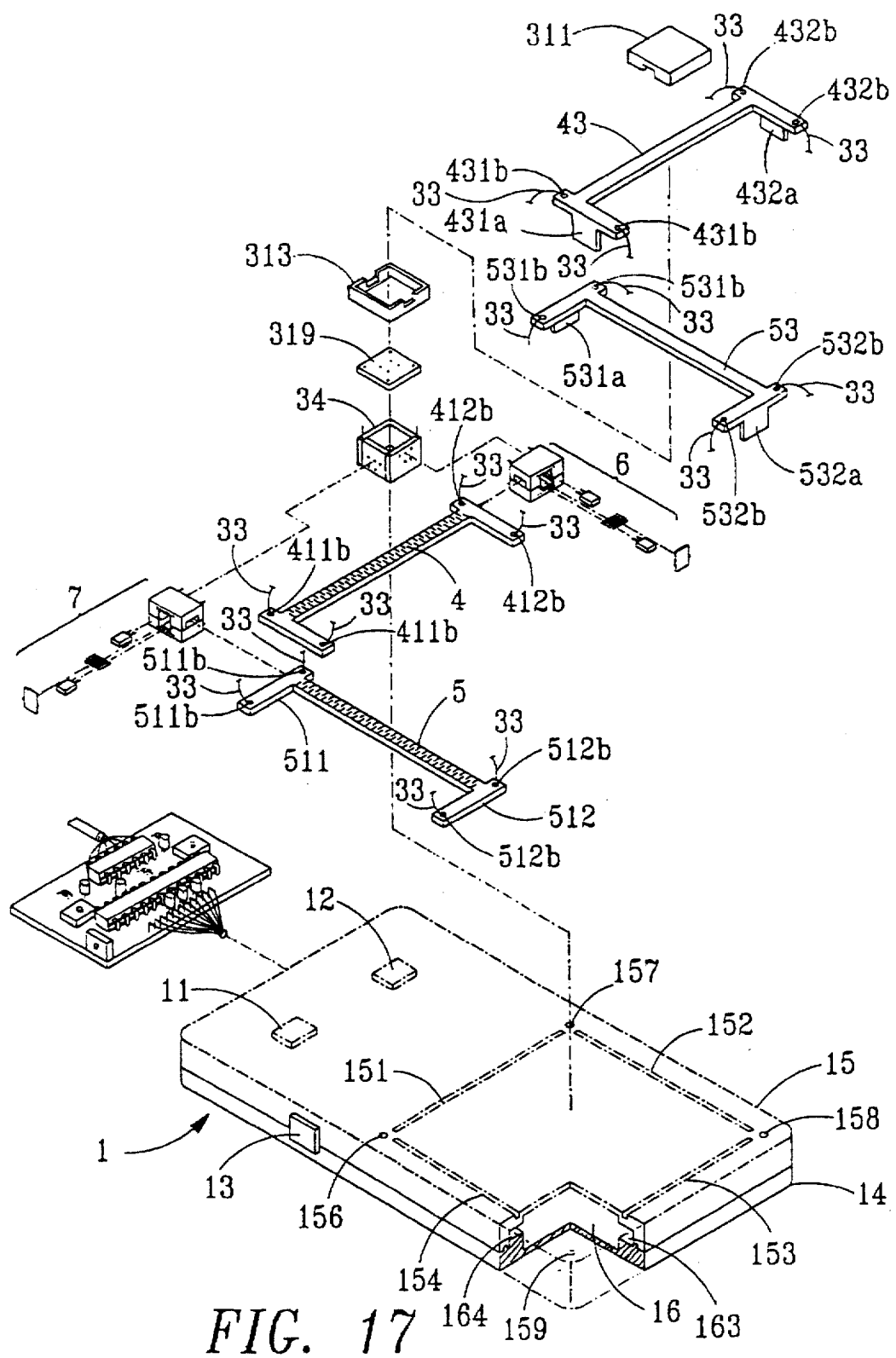
FIG. 17 is an exploded view of the embodiment shown in FIG. 16.

FIG. 16 shows a perspective view of the cursor positioning device in accordance with the sixth embodiment of the present invention. FIG. 17 shows the exploded view of the cursor positioning device shown in FIG. 16. The structure of this embodiment is similar to the forth embodiment as shown in FIG. 9, except that the upper housing 15 is provided with four through holes 156, 157, 158, and 159. Besides, the X-axis slidable bar 43 is provided with a pair of fastening holes 431b and 432b, and the X-axis photo encoder 4 has a pairs of fastening holes 411b and 412b, so that the X-axis photo encoder 4 may be connected with the X-axis slidable bar 43 by means of wires 33 via through holes, for example 156 and 159, on the upper housing 15, similarly, the Y-axis slidable bar 53 is provided with a pair of fastening holes 531b and 532b, and the Y-axis photo encoder 5 has a pairs of fastening holes 511b and 512b.

Figure 18:
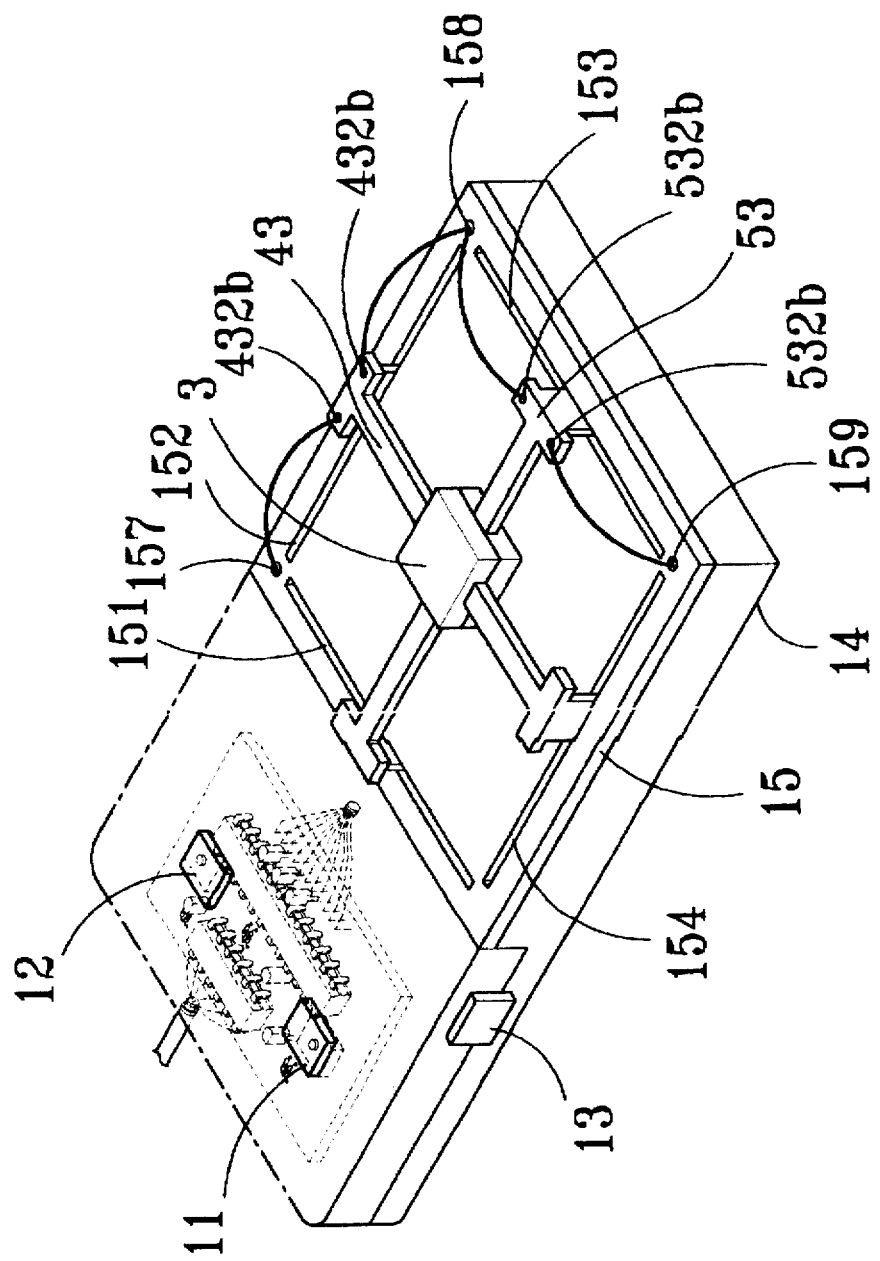
FIG. 18 is a perspective view showing the ninth embodiment of the cursor positioning device of the present invention.
Figure 19:
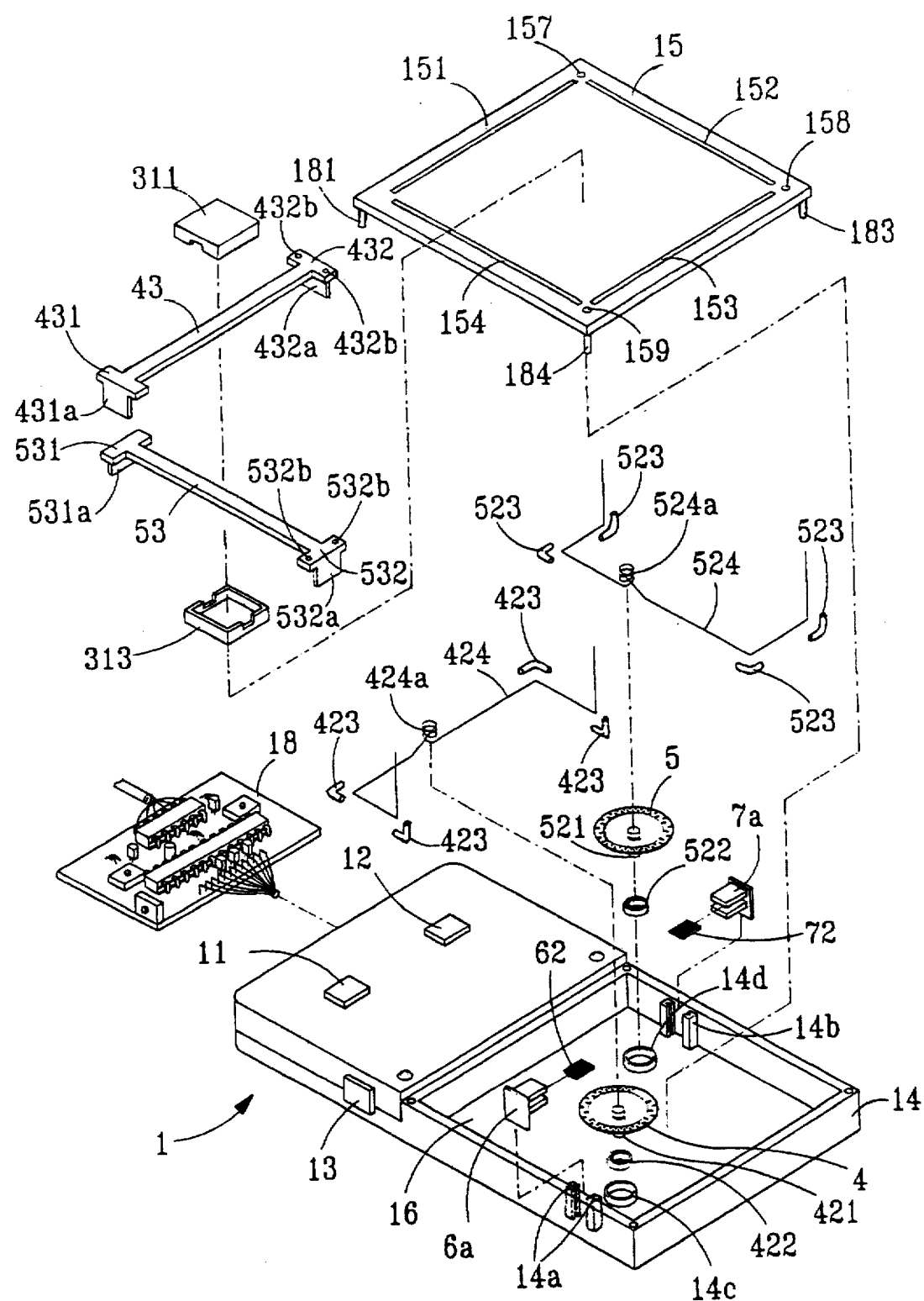
FIG. 19 is an exploded view of the embodiment shown in FIG. 18.

FIG. 18 shows a perspective view of the cursor positioning device in accordance with the ninth embodiment of the present invention. FIG. 19 shows the exploded view of the cursor positioning device shown in FIG. 18. The structure of this embodiment is similar to the eighth embodiment as shown in FIG. 16, except that the upper housing 15 is provided with three through holes 157, 158, and 159 instead of four through holes. Besides, both the X-axis photo encoder 4 and the Y-axis photo encoder 5 are designed to have a disc structure with circular encoder. The shaft 421 of the X-axis photo encoder 4 with a ball bearing 422 is located at a bearing seat 14c. A guiding wire 424 having a central winding portion 424a winds around the shaft 421 of the photo encoder 4, and its two ends are fasten to a pair of fastening holes 532b of the Y-axis slidable bar 53 respectively via several guide tubes 423 and through holes 158 and 159. Similarly, the shaft 521 of the Y-axis photo encoder 5 with a ball bearing 522 is located at a bearing seat 14d. A guiding wire 524 having a central winding portion 524a winds around the shaft 521 of the photo encoder 5, and its two ends are fasten to a pair of fastening holes 432b of the X-axis slidable bar 43 respectively via several guide tubes 523 and through holes 157 and 158. A photo detector 6a with a calibrating photo encoder 62 is mounted on a vertical seat 14a closed to the position of the X-axis photo encoder 4, so as to detect the rotation of the X-axis photo encoder 4. A photo detector 7a with a calibrating photo encoder 72 is mounted on a vertical seat 14d closed to the position of the Y-axis photo encoder 5, so as to detect the rotation of the Y-axis photo encoder 5. When the user moves the X-axis slidable bar 43 and Y-axis slidable bar 53 by operating the finger controllable member 3 which is composed of an upper case 311 and a lower case 313, the photo encoders 4 and 5 will rotate. The X-axis photo detectors 6a and Y-axis photo detector 7a are capable of detecting the rotation of the photo encoders 4 and 5 respectively, and the detected movement signal is transmitted to the control circuit board 18 for further processes. Because both the photo encoders 4 and 5 of this embodiment are in a circular form, it requires smaller operating space comparing to the previous embodiments described above.

Figure 25:
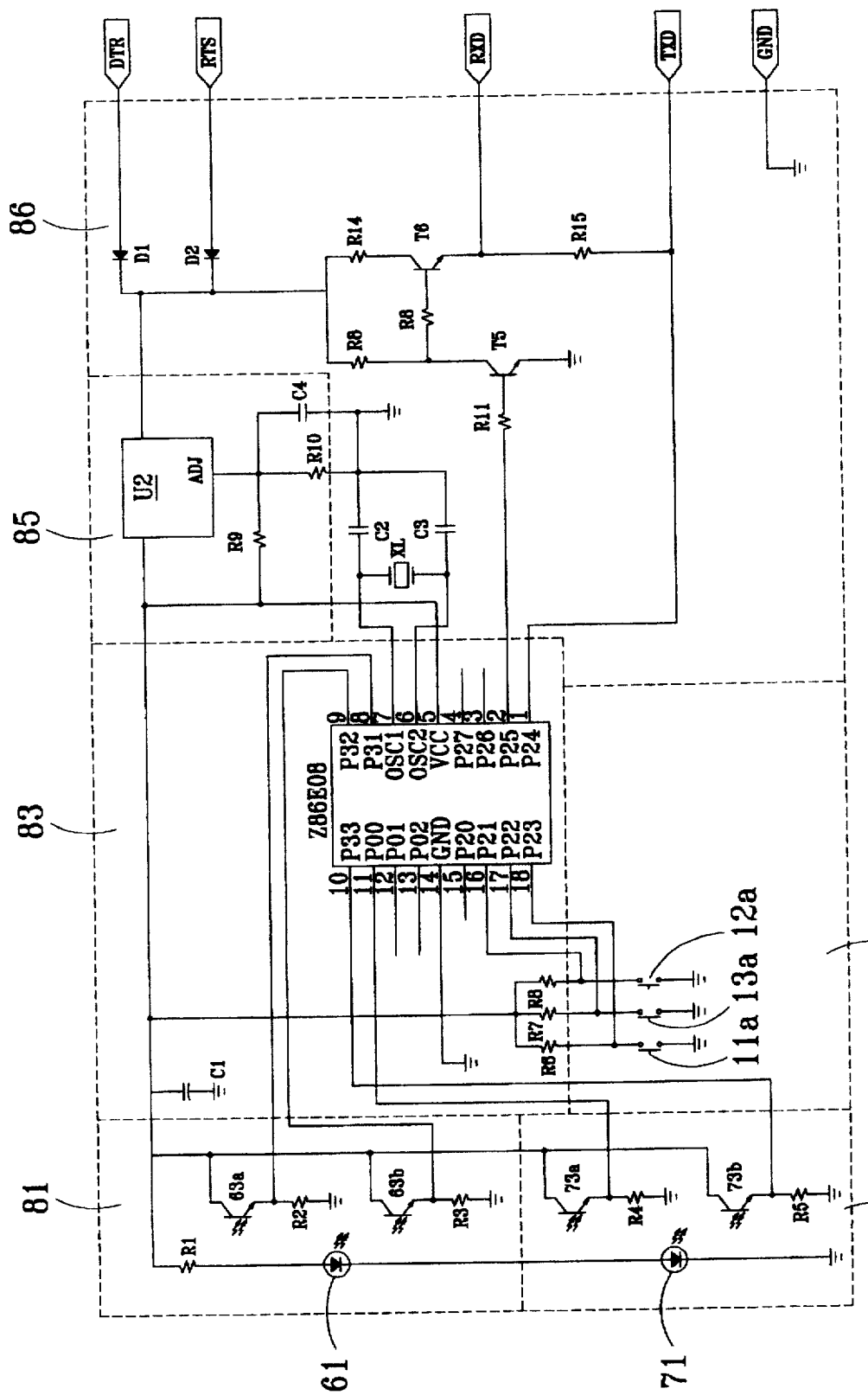
FIG. 25 is a control circuit suitable to apply to the photo detector shown in FIG. 20.
Figure 27A:
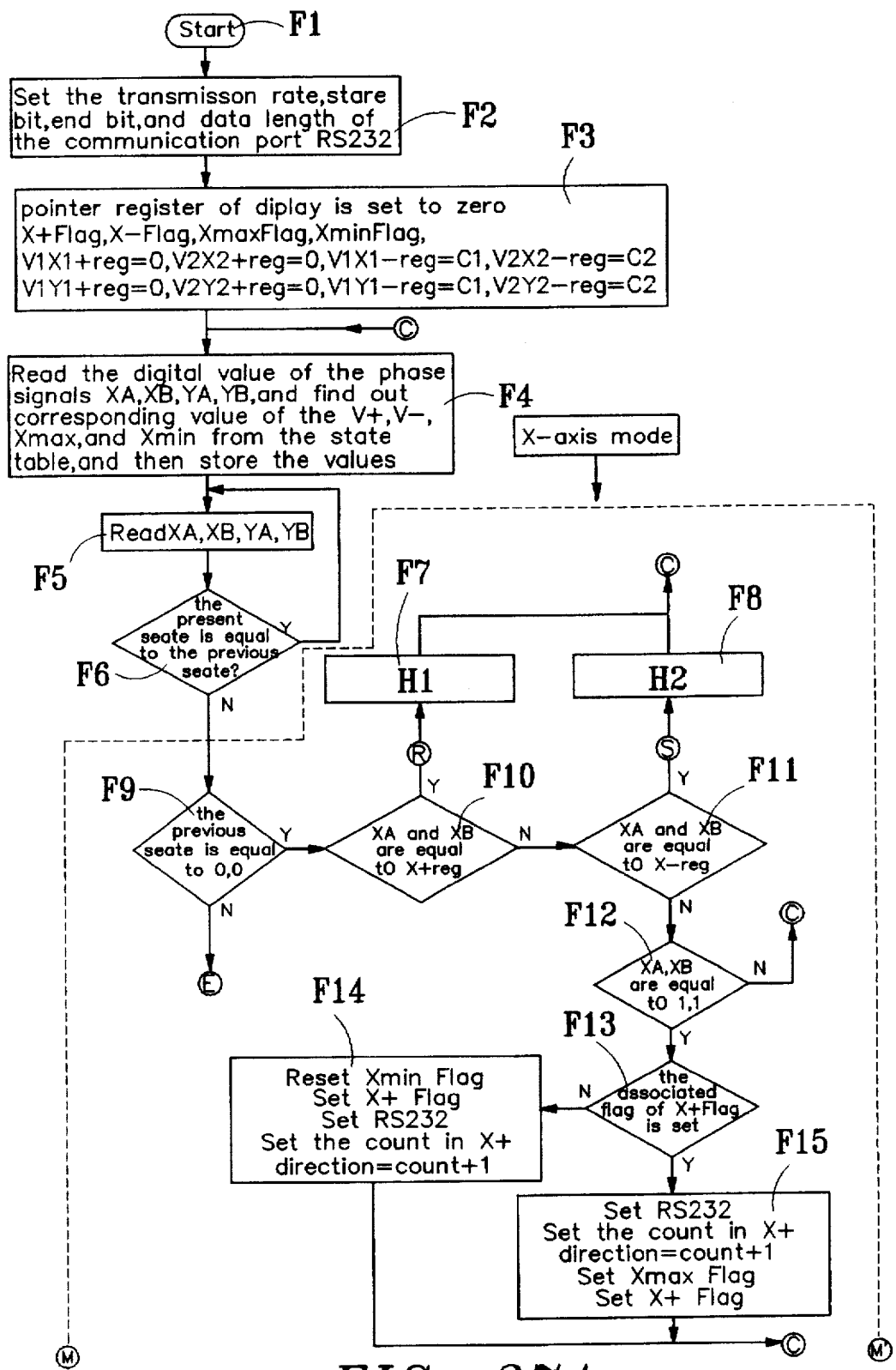
FIGS. 27A to 27E are control flow charts for the control circuit shown in FIG. 25.
Figure 27B:
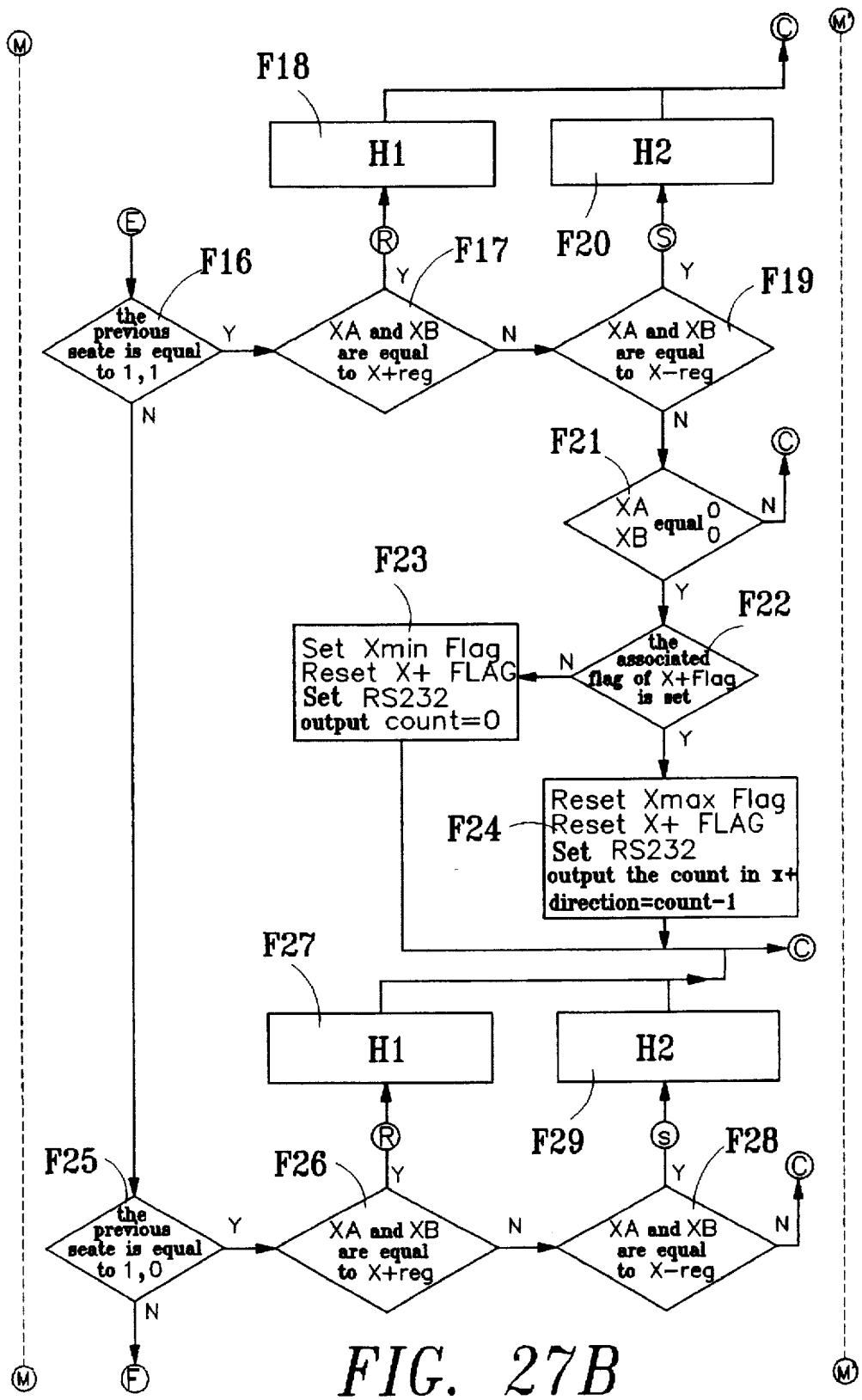
Figure 27C:
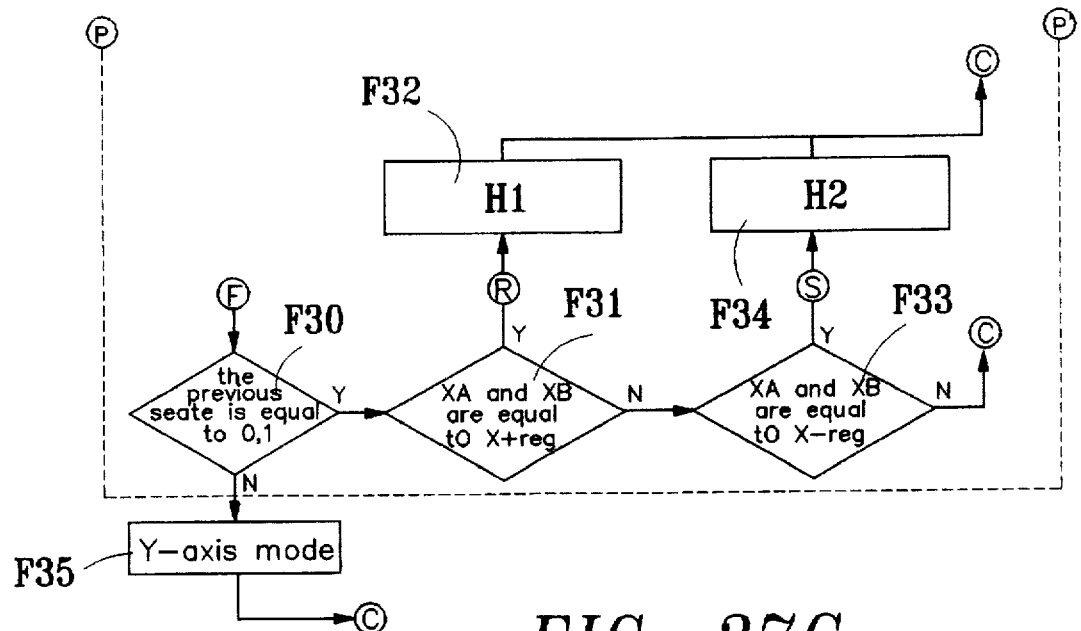

FIGS. 20A to 20F show the structure and signal waveform of the photo encoder and the photo detector in accordance with the pointing device of the present invention. This embodiment uses two photo transistors to detect the light beam of a LED. The photo encoder 4 has two printed pattern lines as shown in FIG. 20A. Both the printed pattern line has a series of mask sections and transparent sections interleavely with uniform width, but with 90 degrees phase difference therebetween. When the photo encoder 4 is moved relative to the photo detector 6 as shown in FIG. 20C, the light generated by the LED 61 will be detected by the photo detector 63 via the photo encoder 4 and the calibrating photo encoder 62. Therefore, the photo detector 63 generates a series of binary pulse signals and transmits the signals to the control circuit board 18. Under performance of the control circuit as shown in FIG. 25 and the control flows as shown in FIG. 27A to 27C, the moving direction of the photo encoder may be detected according to the binary pulse signals.

Referring to FIG. 20A again, it shows that one end of the X-axis photo encoder 4 has a transparent end section 4C1, and the other end thereof has a mask end section 4C2. The purpose of the transparent and mask end section is to serve as a left margin Xmin and a right margin Xmax of the X-axis photo encoder. Similarly, the Y-axis photo encoder has a left margin and a right margin. It is to be understood from this arrangement that the margin are obtained directly from the photo encoder capable of providing digital form signal. Obviously, the present invention is different from the prior art, and it is easier to design a control program for determination.

Alternately, the photo encoder 4 of the present invention may has an end section 4C3 combining a transparent line and a mask line as shown in FIG. 20F, instead of the end section 4C1 and 4C2 shown in FIG. 20A. In performance, both the signals XA and XB will be changed its phase at the same time after reaching the margin of the photo encoder 4 and exceeding a distance of ¼ period. On the contrary, the phase of signal XA or XB will be changed when it does not reach the margin of the photo encoder. So, the control circuit of the present invention may detect whether the phase of the signals XA and XB is changed at the same time to determine whether the photo encoder reaches its margin or not.

Table I is a state table which shows when a computer system connected with the cursor positioning device of the present invention receives the signals XA and XB, the computer can determine the moving direction X+ or X− of the positioning device according to the binary value of the signals XA and XB. The computer may get a flag Xmax and a flag Xmin according to the signal X+ and X− respectively, and then store the status of the flags into a register.

TABLE I

|  | 1 | 2 | 3 | 4 |
|---|---|---|---|---|
| XA | 0 | 1 | 1 | 0 |
| XB | 0 | 0 | 1 | 1 |
| X+ direction | | | | |
| XA | 1 | 1 | 0 | 0 |
| XB | 0 | 1 | 1 | 0 |
| X− direction | | | | |
| XA | 0 | 0 | 1 | 1 |
| XB | 1 | 0 | 0 | 1 |
| Xmax | 1 | | | |
|  | 1 | | | |
| Xmin | 0 | | | |
|  | 0 | | | |
| Flag: Xmax Xmin X+ | | | | |

TABLE I-continued

Register: Xreg, X+reg, X–reg,
Xmax reg, Xmin reg

Referring to FIG. 20B again, it shows a perspective view of the X-axis photo detector 6 suitable to use the photo encoder as shown in FIG. 20A. The photo detector is composed of a LED 61, a fixed calibrating photo encoder 62, and a photo transistor 63. The arrangement of the components of the photo detector and the movable photo encoder 4 is illustrated in FIG. 20C. As shown in the drawing, the photo encoder 4 is arranged between the fixed calibrating photo encoder 62 and the LED 61. Therefore, the light beam transmitted by the LED 61 may either reach to the photo transistor 63 via the movable photo encoder 4 or be obstructed by the photo encoder. The fixed calibrating photo encoder 62 has a series of printed patterns including transparent sections and mask sections interleavely as shown in FIG. 20D, and the width of the printed pattern is designed to correspond to that of the movable photo encoder 4. In a preferred embodiment of the present invention, the movable photo encoder 4 is very closed to the fixed calibrating photo encoder 62, so that the light beam generated by the LED 61 reaches the photo transistor 63 through the movable photo encoder 4 without light diffusion. FIG. 20E shows a series of pulse signals XA and XB generated by the photo detector assembly.

It is noted that the movable photo encoder 4 of the present invention is equipped with interleaved printed patterns and the movable photo encoder 4 is designed to close to the fixed photo encoder 62 in space when moving capable of generating a series of ON and OFF signals. Due to this special design, the pitch of the encoder is possible to reach 320 patterns per inch. The prior art requires laser beam LEDs to get the effect of high density pitch, otherwise the conventional photo detector will has series light diffusion problem. These prior art problems can be simply overcame by the present invention.

Alternatively, the present invention may use four photo transistors structure as shown in FIGS. 21A to 21F, instead of two photo transistors embodiment as described above. The fixed photo encoder 62a has a wider mask section 62aa, the width of which is 1.5 times the other mask section or transparent section of the fixed photo encoder 62a. When the photo transistors 63a and 63b moves, the computer may determine the moving direction of the movable photo encoder according to the binary value detected by the photo transistors, under control of the control circuit shown in FIGS. 26 and 30. In addition, the movable photo encoder 4a has two end mask sections 4aa and 4ab at two ending margin thereof. The width of the end mask sections is two times the other mask section or transparent section of the movable photo encoder. So, the photo transistors 63a and 63c has same phase when the movable photo encoder 4a does not reach margin area. The photo transistors 63a and 63c has contrary phase when the end mask section 4aa reaches to a position between the photo transistor 63c and 63a. Therefore, the present invention may determines whether the movable photo encoder reaches the maximum limited margin Xmax. Similarly, the minimum limited margin Xmin may be determined by detecting whether the other end mask section 4ab reaches the area between the photo transistors 63b and 63d.

Figure 21A:
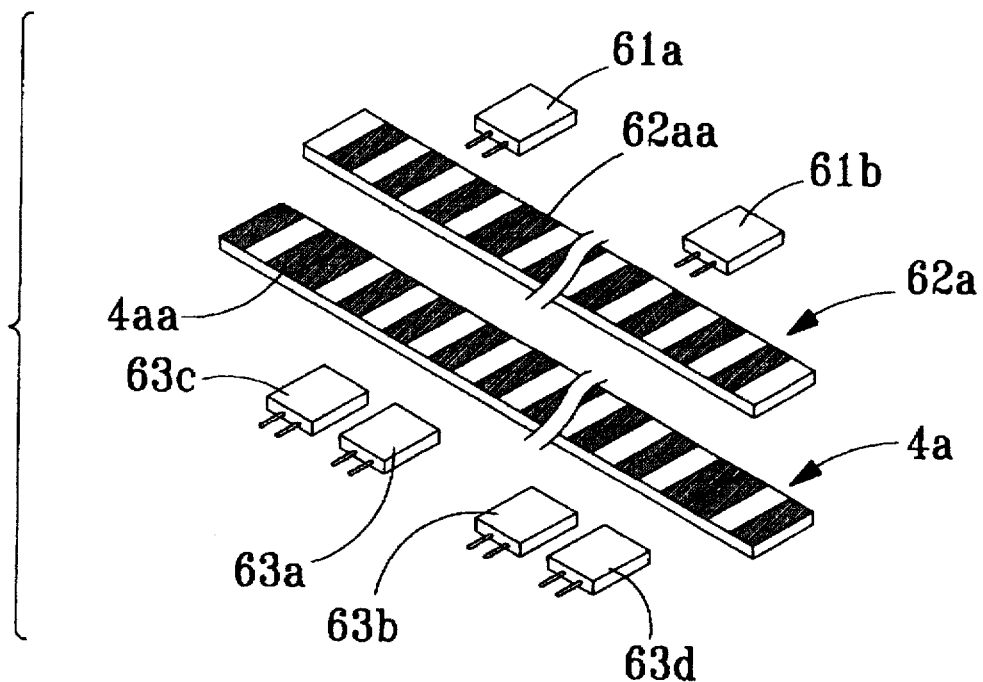
FIGS. 21A to 21F show the structure and associated waveform of a photo detector embodiment using four sets of photo transistors in accordance with the present invention.
Figure 21B:
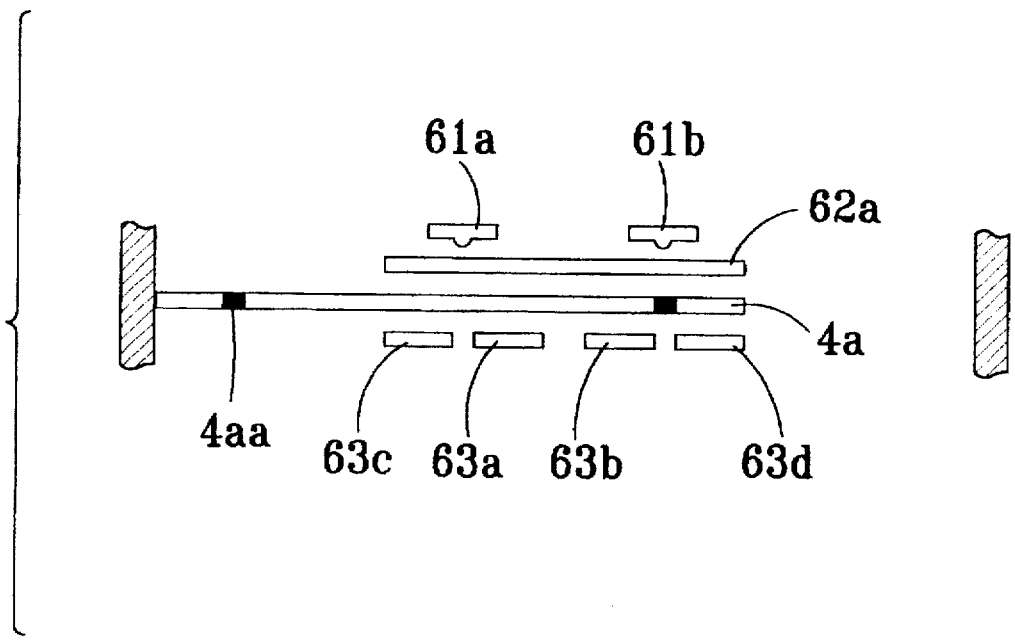
Figure 21C:
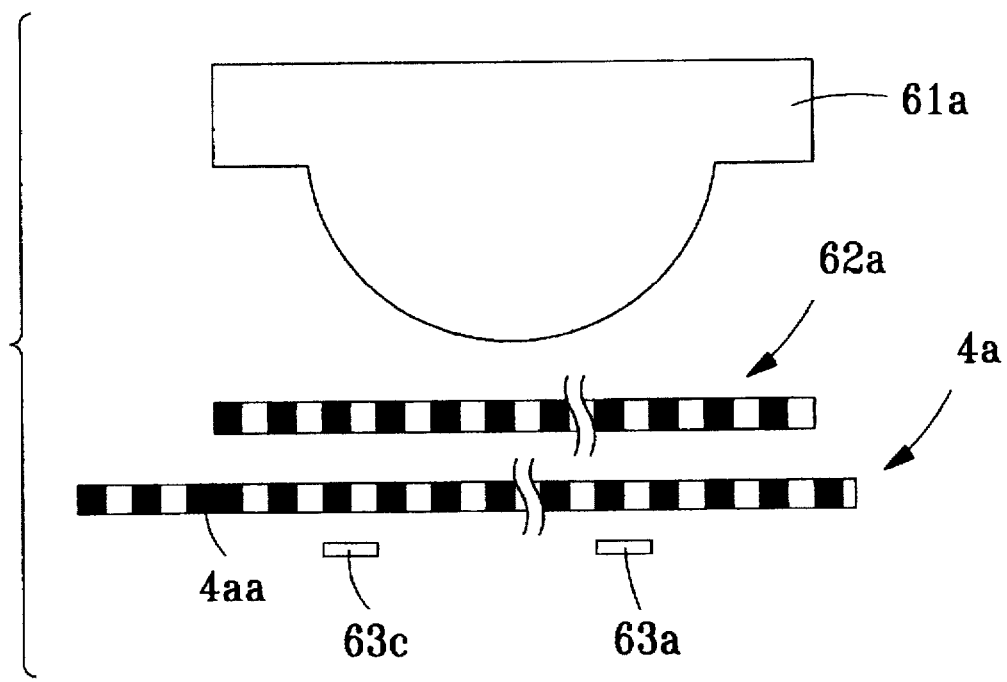

FIG. 21C further shows a top plan view of the LED 61a, the fixed photo encoder 62a, the movable photo encoder 4a, and the photo transistors 63c and 63a of FIG. 21A.

Figure 21D:
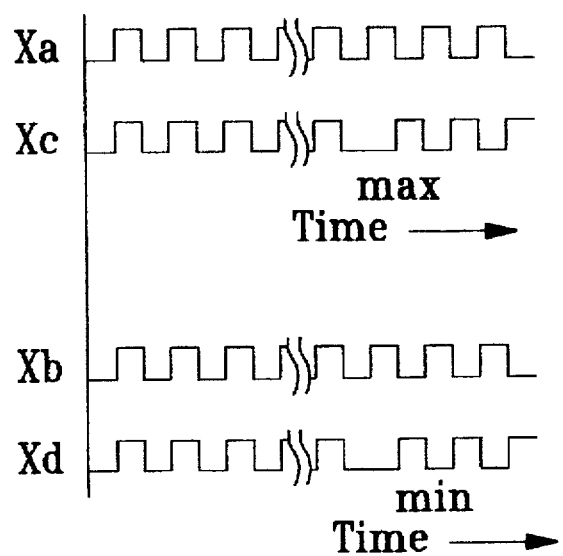
Figure 26:
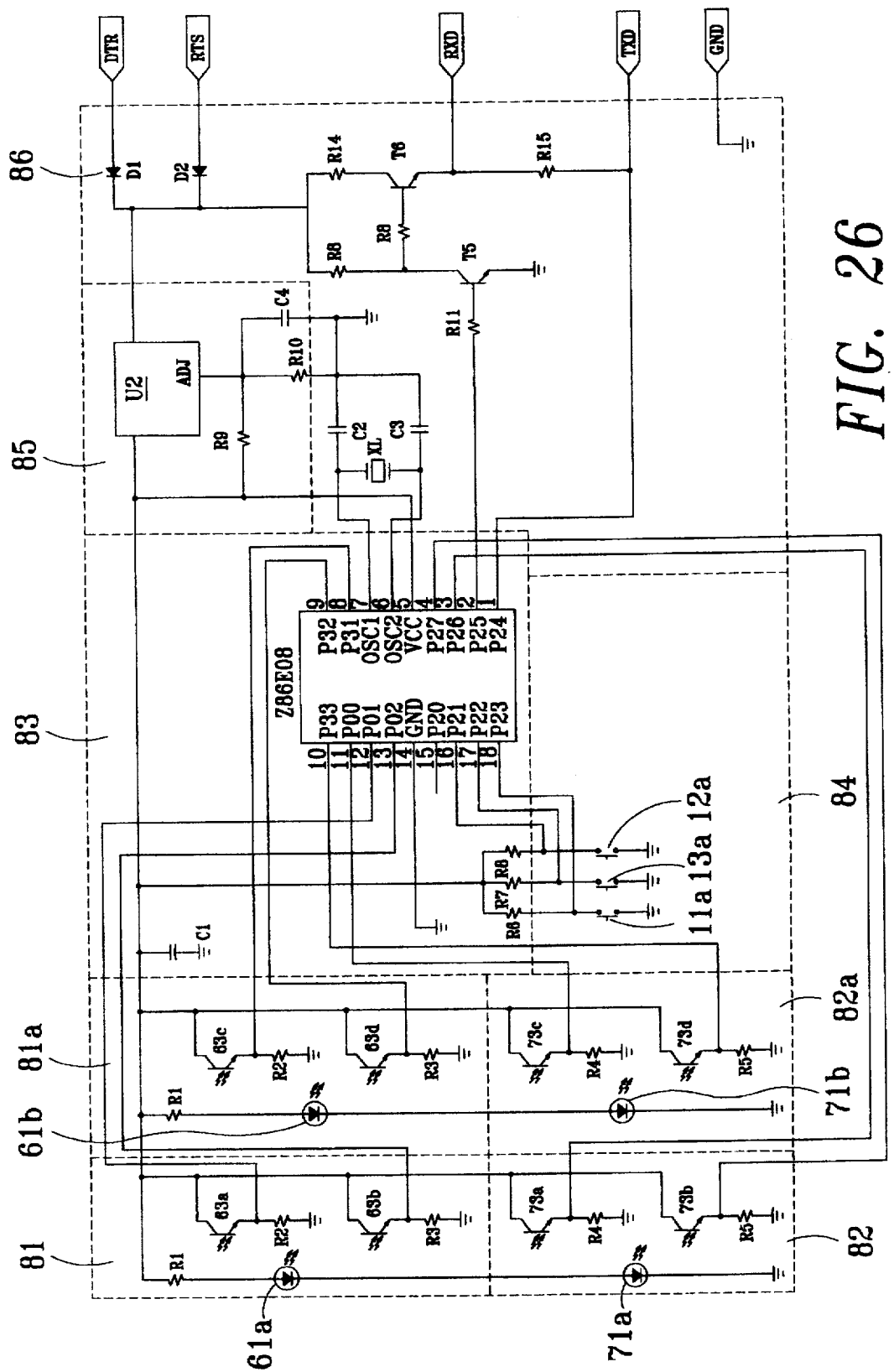
FIG. 26 is a control circuit suitable to apply to the photo detector shown in FIG. 21.
Figure 30:
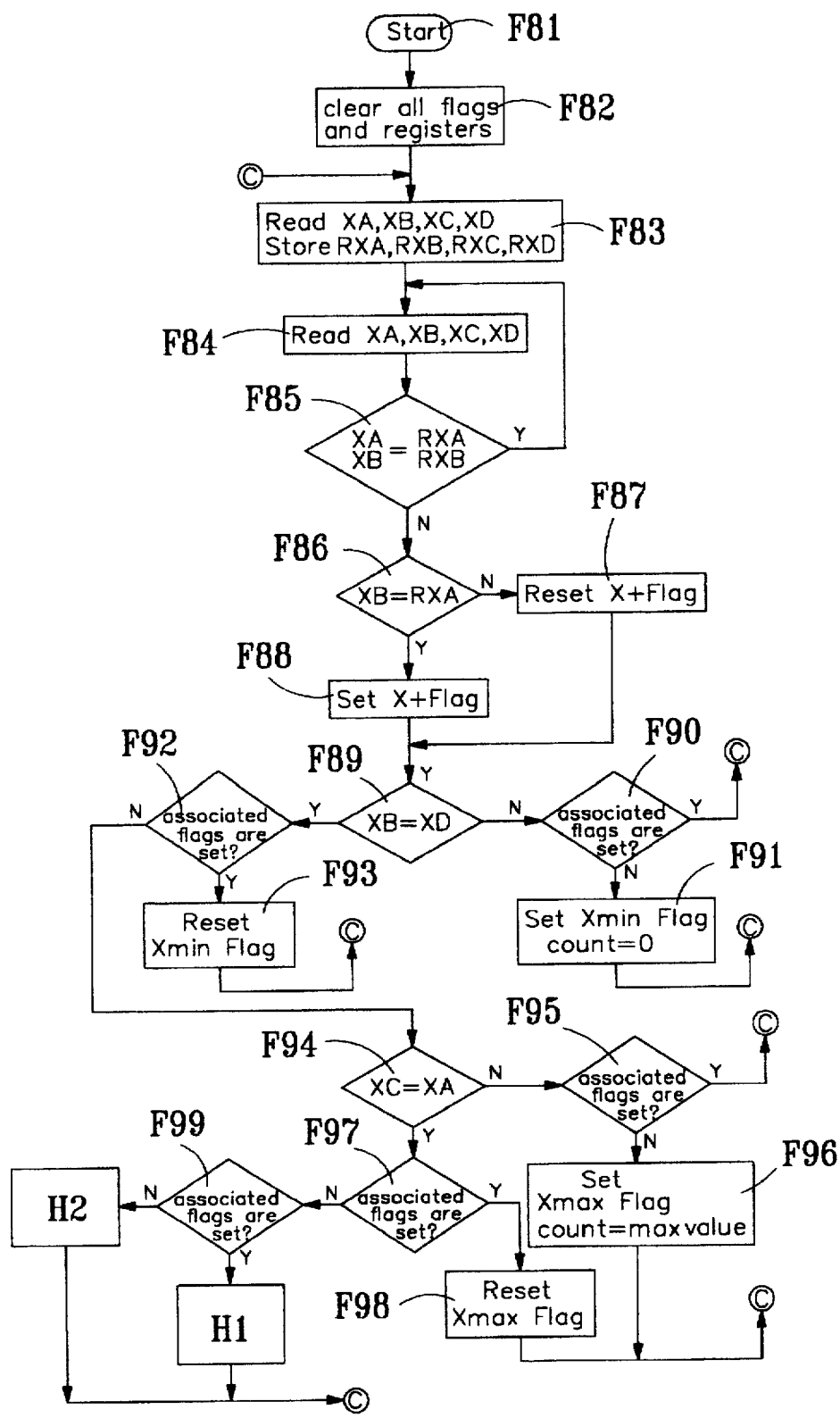
FIG. 30 is a control flow chart for the control circuit shown in FIG. 26.
Figures 31A, 31B:
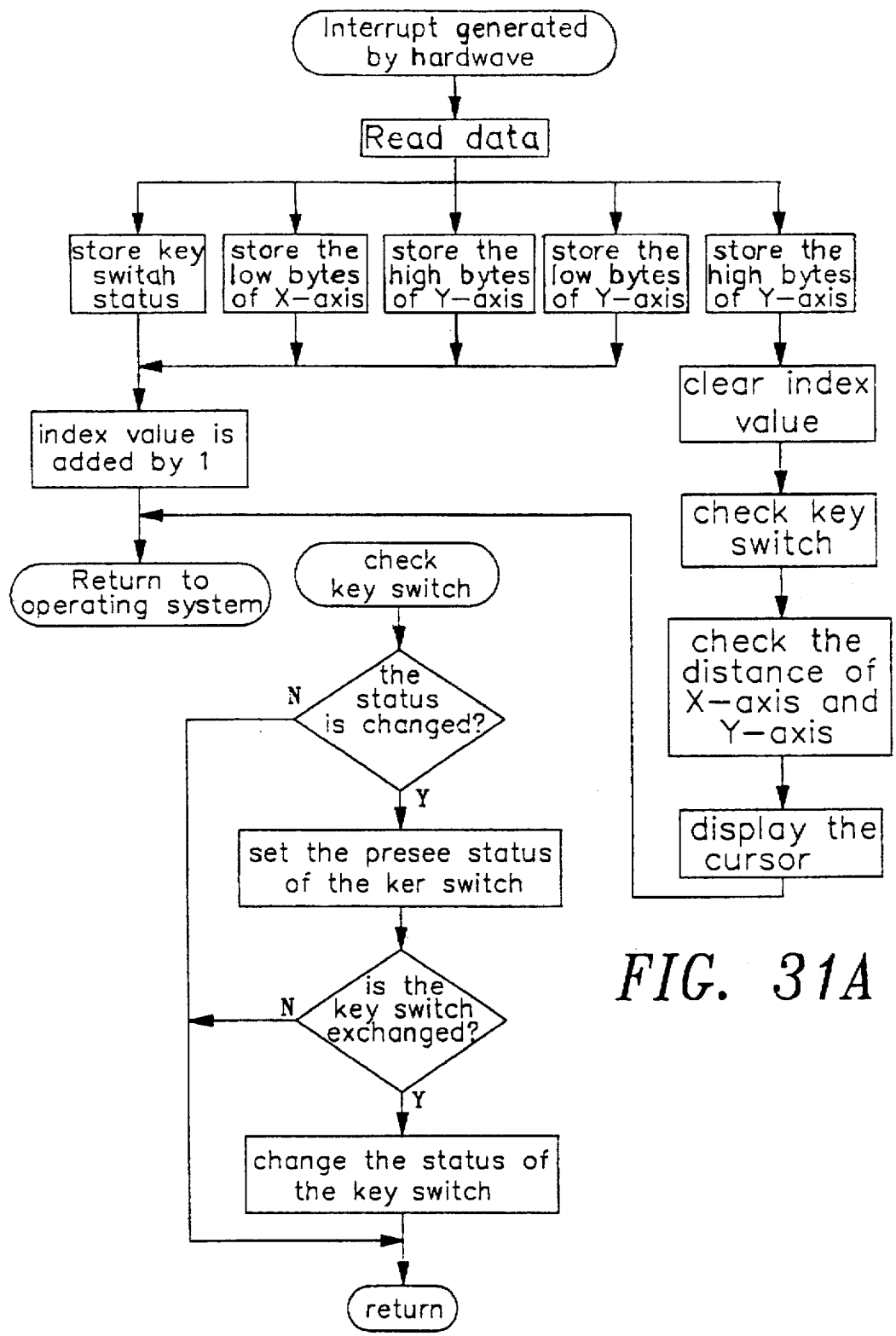
FIGS. 31A to 31D are control flow chart of the computer driving program.
Figures 31C, 31D:
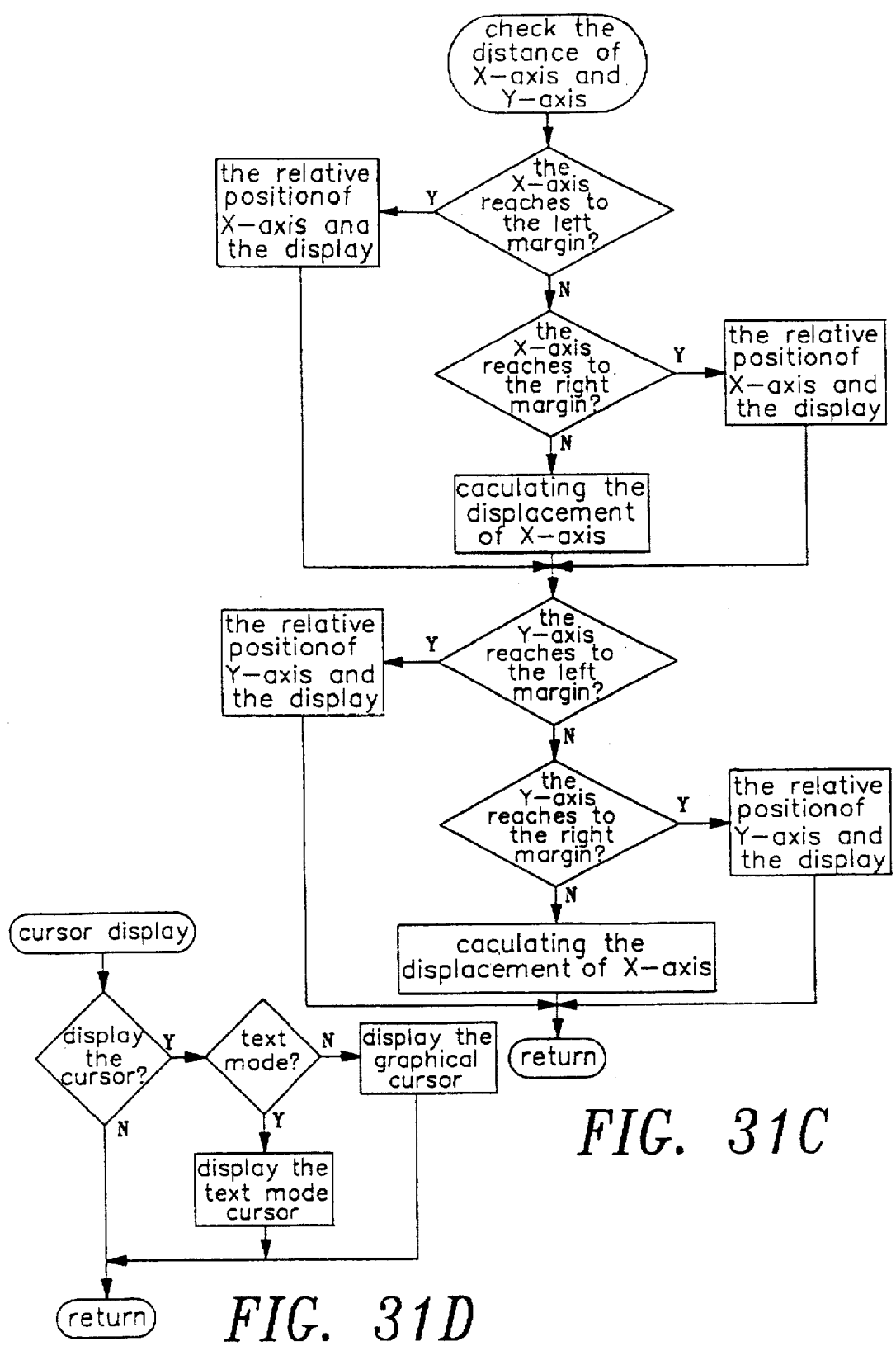

FIG. 21D shows a series of X-axis signal pulses generated by the arrangement shown in FIG. 21C, under control of the control circuit shown in FIG. 26 and the firmware shown in FIG. 30. The X-axis signals XA, XB, XC, and XD in a form of binary value will be supplied to the control circuit board 18. The present invention may easily determine the moving direction and margin according to the binary value. Because the signals is obtained from the movable photo encoder, the control circuit, and the firmware, so it is possible to simplify the control program and control circuit. As to the operation of the Y-axis, it is the same as the X-axis operation described above.

Figure 21E:
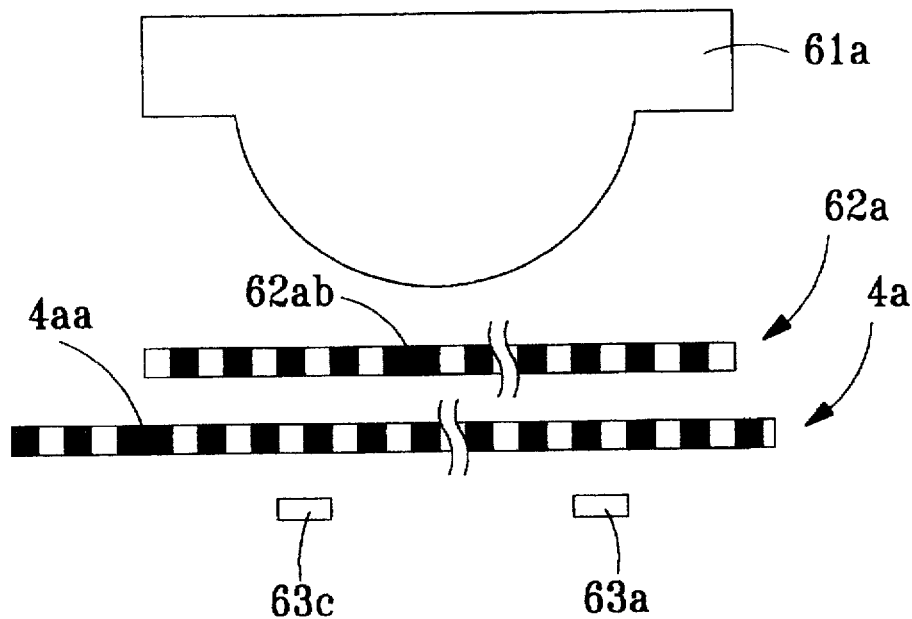

FIG. 21E shows the second embodiment arrangement of the photo encoder in accordance with the present invention, which is similar to the embodiment shown in FIG. 21C, except for the design of the fixed photo encoder 62a. As shown in the drawing a double width mask section 62aa is further positioned between the photo transistors 63c and 63a. The width of the mask section is two times the mask section or transparent section of the fixed photo encoder 62a. In such an arrangement, the photo transistors 63C and 63a will generate contrary phase signal when the positioning device of the present invention does not reach margin. On the contrary, the photo transistors 63C and 63a will generate the same phase signal when the positioning device reaches margin, by detecting whether the double width mask section 62aa enters a region between the photo transistors 63c and 63a.

Figure 21F:
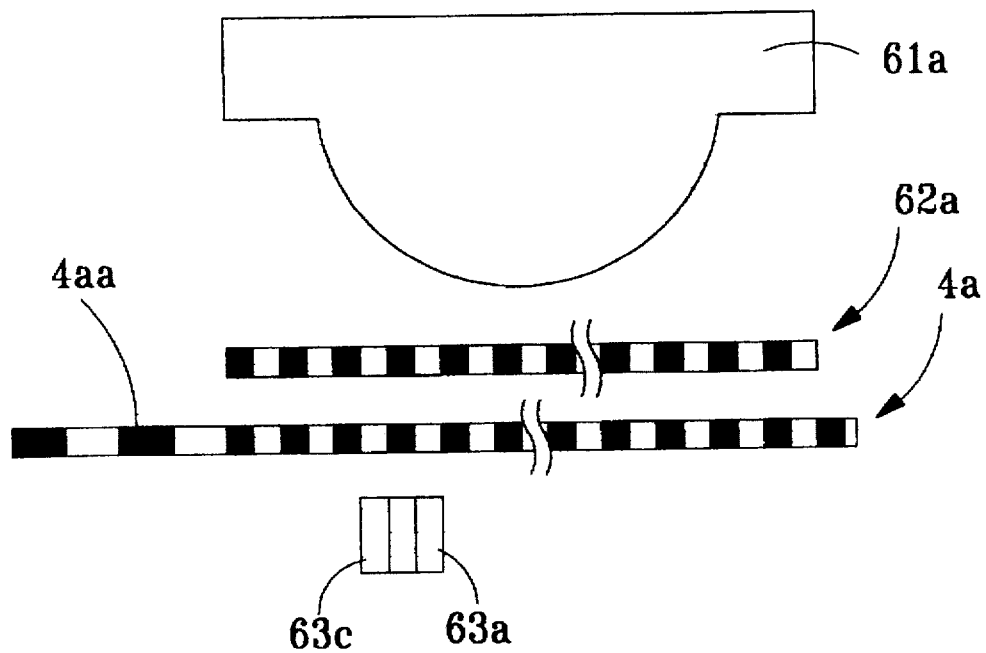
Figure 22A:
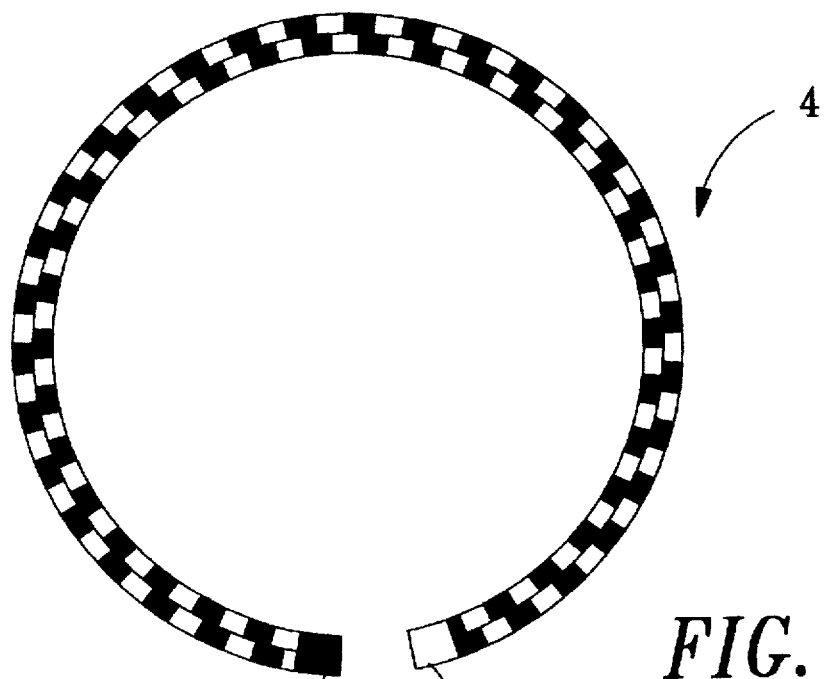
Figure 22B:
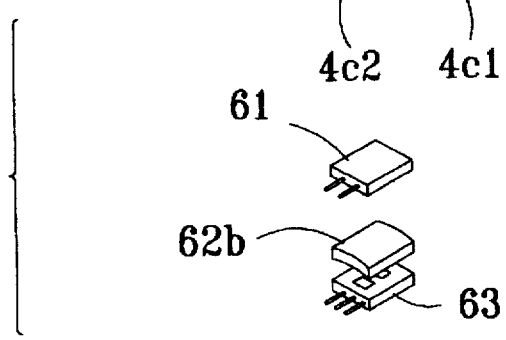
Figure 22C:
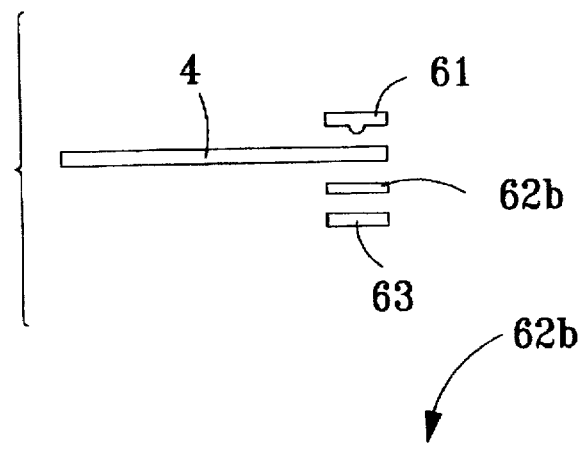
Figure 22D:

FIG. 21F shows the third embodiment arrangement of the photo encoder in accordance with the present invention, which is also similar to the embodiment shown in FIG. 21C, except for the design of the movable photo encoder 4a and the distance between the photo transistors 63c and 63a. As shown in the drawing, a narrow separation in space exists between the photo transistors 63a and 63c, corresponding to the distance of two mask sections or two transparent sections of the movable photo encoder 4a. In such an arrangement, the output signals generated by the transistors 63c and 63a have the same phase when the movable photo encoder does not reach margin. On the contrary, the output signals generated by the transistors 63c and 63a has contrary phase when the movable photo encoder reaches margin.

FIGS. 22A to 22D show a preferred photo encoder structure suitable to be used by the ninth embodiment of the present invention described above. As shown in FIG. 11A, the photo encoder 4 is in a circular form. One end of the circular photo encoder is formed as a transparent section 4c1, while the other end thereof is formed as a mask section 4c2, for the purpose of determining the left margin Xmin and the right margin Xmax. In addition, the circular photo encoder 4 is composed of two circular patterns, the outer circular pattern is used to generate the signal XA and the inner circular pattern is used to generate the signal XB. The margin signals in a digital form may be directly generated by detecting the movable photo encoder, so that the control program of the cursor positioning device is rather simple.

Figure 23A:
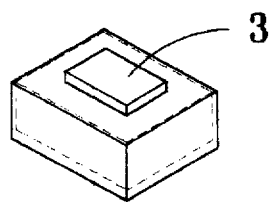
FIGS. 23A to 23H show the structure of the photo detector applied to the first to eighth embodiments of the present invention.
Figure 23B:
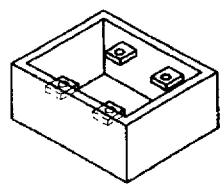
Figure 23C:
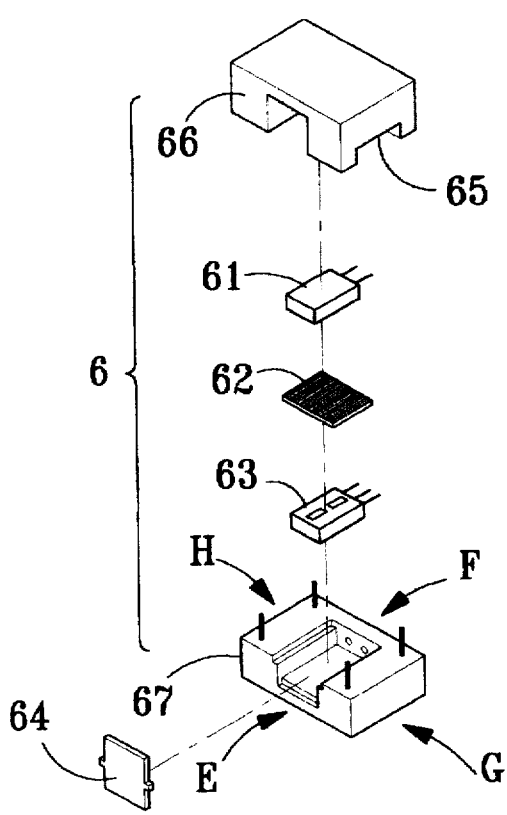
Figure 23D:
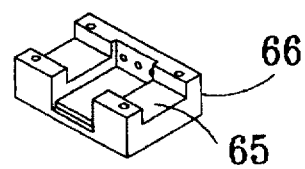
Figure 23E:
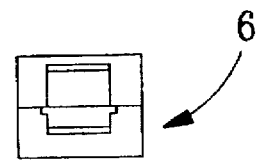
Figure 23F:
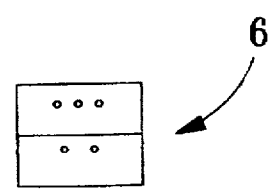
Figure 23G:
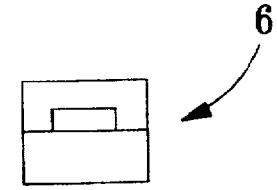
Figure 23H:
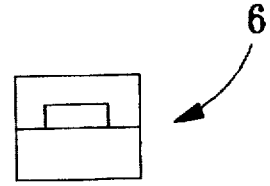

FIGS. 23A to 23H show a preferred structure of the photo detector suitable to be used in the first embodiment through the eighth embodiment described above. FIG. 23A shows a perspective view of the finger controllable member 3, and FIG. 23B shows a bottom perspective view of the finger controllable member. FIG. 23C shows an exploded view of the X-axis photo detector according to a preferred embodiment of the present invention, wherein the upper case 66 is mounted with a LED 61 and the lower case 67 is mounted with a photo transistor 63. The upper case 66 is provided with a recess 65 for the X-axis movable photo encoder 4, so that the photo transistor 63 may generate digital phase signals XA and XB by detecting the movement of the photo encoder 4. A calibrating photo encoder 62 is further attached to the upper surface of the photo transistor 63. A cover plate 64 is used to cover and protect the LED 61 and the photo transistor 63. FIG. 23D is a bottom perspective view of the upper case 66, further illustrating the formation of the recess 65. FIGS. 23E, 23F, 23G, and 23H show the front elevational view, the rear elevational view, the left side view, and the right side view of the photo detector respectively after assembly.

Figure 24:
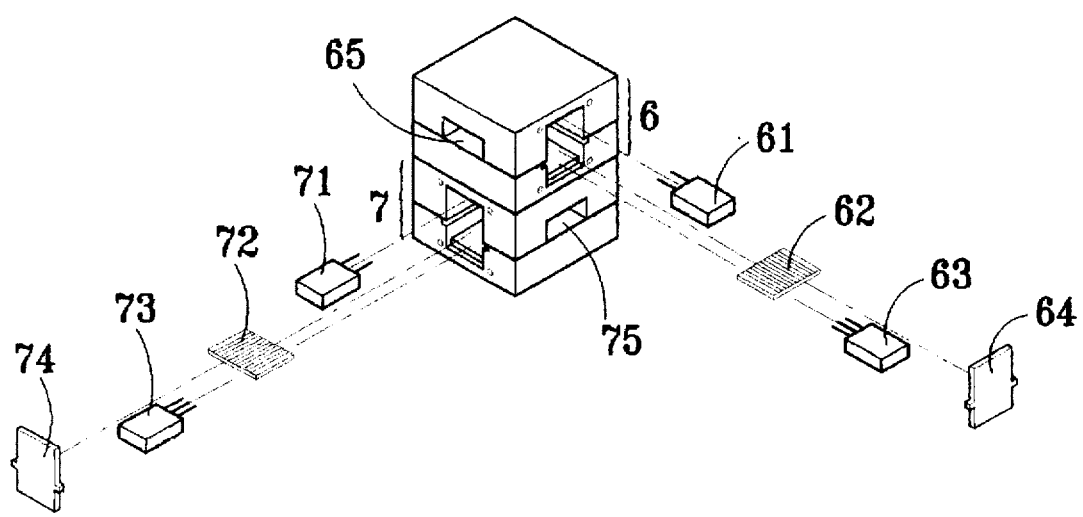
FIG. 24 is a perspective view showing another embodiment of the structure of the photo detector shown in FIG. 23.

FIG. 24 is a perspective view showing another embodiment of the photo detector, instead of the structure shown in FIG. 23. In this embodiment, the X-axis and Y-axis photo detectors 6 and 7 are arranged in a stack structure for further saving installation space. The X-axis photo detector 6 includes a LED 61, a fixed calibrating photo encoder 62, a photo transistor 63, and a cover plate 64. A X-axis movable photo encoder (not shown) may be slidable through the recess 65 formed on the upper case of the photo detector 6. The Y-axis photo detector 7 includes a LED 71, a fixed calibrating photo encoder 72, a photo transistor 73, and a cover plate 74. A Y-axis movable photo encoder (not shown) may be slidable through the recess 75 formed on the upper case of the photo detector 7.

FIG. 25 is a detail control circuit diagram with two sets of photo detecting circuits, suitable to be applied to FIG. 20. A X-axis photo detecting circuit 81 includes a LED 61 for generating a light beam. A first photo transistor 63a may detect the light beam and then output a phase signal XA, and the second transistor 63b may also detect the light beam and then output a phase signal XB. Similarly, A Y-axis photo detecting circuit 82 includes a LED 71 for generating a light beam. A first photo transistor 73a may detect the light beam and then output a phase signal YA, and the second transistor 73b may also detect the light beam and then output a phase signal YB. The detected X-axis and Y-axis phase signals are supplied to a processing circuit 83 for further processes. A switch circuit 84 are electrically connected to the processing circuit 83, which includes a left switch 11a, a right switch 12b, and a middle switch 13c. The control circuit is provided with a voltage regulating circuit 85 for supplying a stable power source. An output circuit 86 is used to amplify the output signal supplied from the processing circuit 83 and then supply the amplified output signal to a host computer (not shown) via transmission lines.

FIG. 26 is a detail control circuit diagram with four sets of photo detecting circuits, with reference to the photo detector shown in FIG. 20. In this embodiment, the X-axis phase signals are detected by two photo detecting circuit 81 and 81a. The first X-axis photo detecting circuit 81 includes a LED 61a for generating a light beam which will be detected by the photo transistors 63a and 63b. The second X-axis photo detecting circuit 81a includes a LED 61b for generating a light beam which will be detected by the photo transistors 63c and 63d. The Y-axis phase signals are detected by two photo detecting circuit 82 and 82a. The first Y-axis photo detecting circuit 82 includes a LED 71a for generating a light beam which will be detected by the photo transistors 73a and 73b. The second Y-axis photo detecting circuit 82a includes a LED 71b for generating a light beam which will be detected by the photo transistors 73c and 73d. The detected X-axis and Y-axis phase signals are supplied to a processing circuit 83 for further processes. A switch circuit 84 are electrically connected to the processing circuit 83, which includes a left switch 11a, a right switch 12b, and a middle switch 13c. The control circuit is provided with a voltage regulating circuit 85 for supplying a stable power source. An output circuit 86 is used to amplify the output signal supplied from the processing circuit 83 and then supply the amplified output signal to a host computer (not shown) via transmission lines.

Referring to FIG. 27A, the computer first set the transmission rate, start bit, end bit, and data length of the communication port RS232 in step F2, followed by performing system initialization step F1. In step F3, all flag status,registers, and associated value for determination of operating speed are cleared. Thereafter, the computer reads the digital value of the phase signals XA, XB, YA, and YB, and finds out corresponding value of the X+, X−, Xmax, and Xmin from the state table of TABLE I as listed previously (only show the state of X-axis), and then stores the values for further comparison. The computer will reads the values XA, XB, YA, and YB again in step F5, and then compares these values with the first read values, to determine whether the status is changed or not. If the status is not changed, it indicates the finger controllable member of the cursor positioning device has no movement, and the procedure will return to read the XA, XB, YA, and YB again. On the contrary, if the status is changed, a X-mode determination procedure outlined by dot line as shown in FIG. 27A, is performed. There are four possible status i.e. (0,0), (1,0), (1,1), and (0,1) to be compared with the previous status. The computer may get the information about the moving speed of the cursor positioning device by calculating the time of changing of the various status. Typically, the system clock of the computer is ranged from 4 to 8 MHz nowadays. In practice, it is found that the normal operating speed that the user moves the finger controllable member of the cursor positioning device is below 5 KHz. Therefore, the computer may easily detect the operating speed of the cursor positioning device.

The computer may determine the position of the cursor with reference to TABLE I above and the pulse signal listed in FIG. 20E. At first, the computer supposes the previous status is (0,0) in step F9. In case that XA=1 and XB=0, it indicates the finger controllable member is moved to direction X+, while in case that XA=0 and XB=1, it indicates the finger controllable member is moved to direction X−. In case that XA=1 and XB=1, it indicates the finger controllable member either reaches a minimum limit or maximum limit dependent on whether the flag X+flag is set or not. After these determinations, various flag status X+, Xmin, Xman, etc. are obtained, and then these flag status are accumulated in predetermined registers for further judgment for the control program. So, in practical operation, the user just simply moves the finger controllable member to the left upper corner of the device to perform zero position initialization, and then the device can generate correct X-axis and Y-axis absolute coordinate values.

Figure 27D:
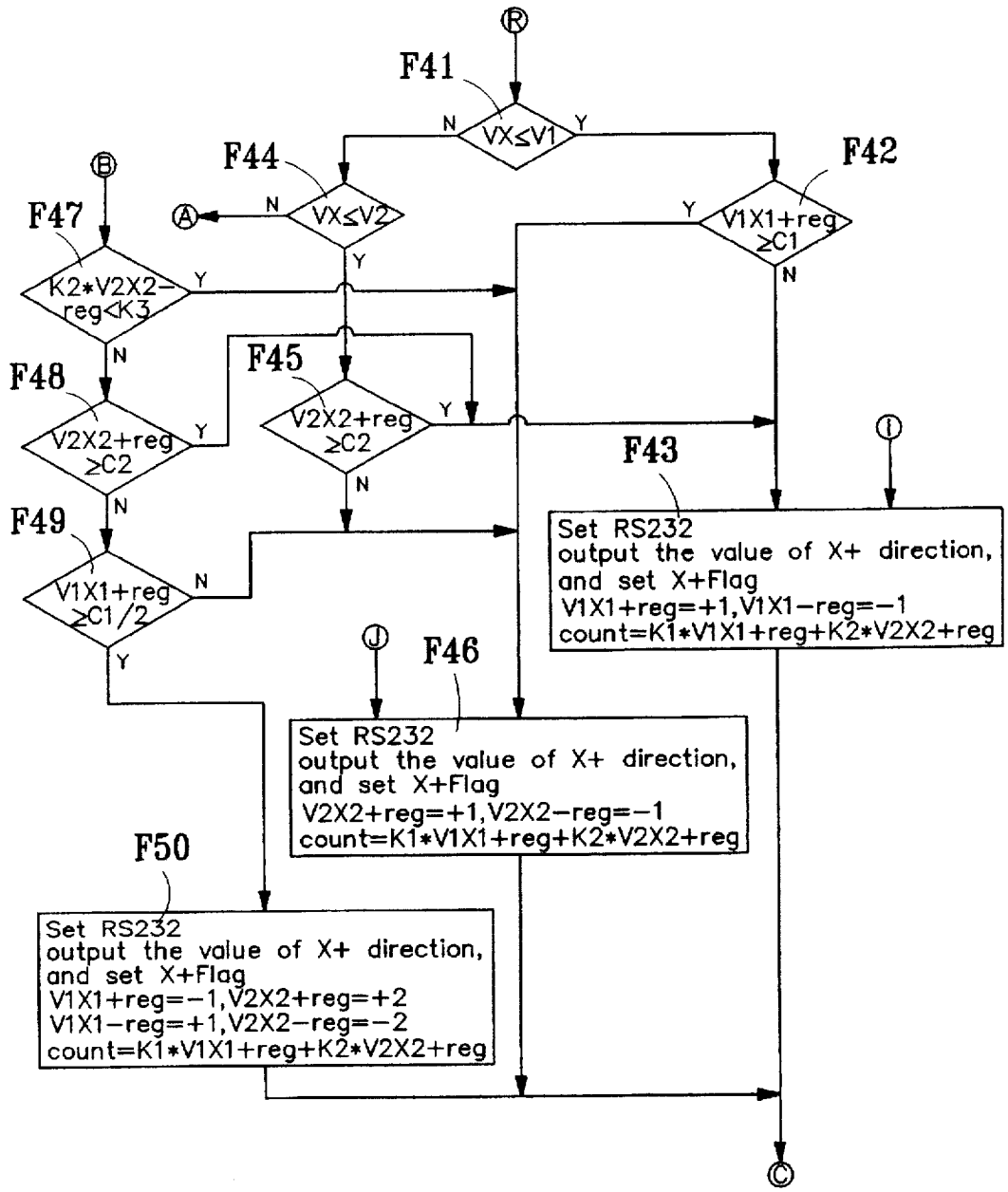
Figure 27E:
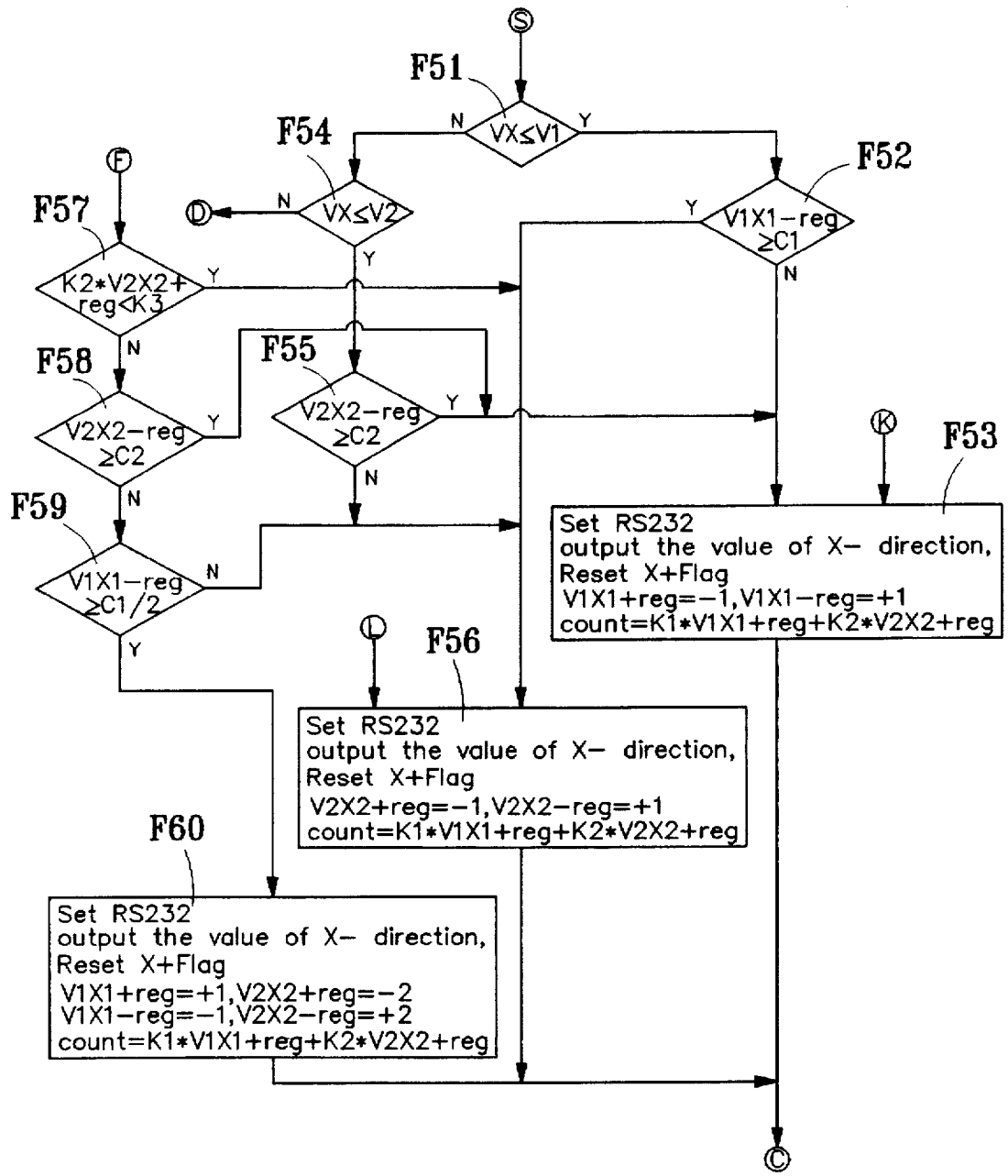

FIGS. 27D is a subprogram flow chart of the control program, explaining how the cursor is moved to positive direction, while FIGS. 27E is a subprogram flow chart of the control program, explaining how the cursor is moved to the other direction. The displacement of the cursor moving on the computer display is proportional to the moving distance of the finger controllable member. The factor of the proportion depends on the moving speed of the finger controllable member. The purposes of these procedures are as follows:

1. To limit the displacement of the finger controllable member to a range about 16 mm or less. Inspitefully, the movement of the cursor representing on the computer display is not effected by the shorten displacement, and the different moving speed of the finger controllable member. So, the present invention is impossible has problems of the prior art that the finger controllable member already reaches a margin of the positioning device but the cursor not reaches a corresponding margin on the computer screen; nor the finger controllable member not yet reaches a margin of the positioning device but the cursor already reaches a margin on the computer screen.

2. When the cursor on the display moves to any desired position thereon, there are necessary fine displacements around the position.

3. The moving speed and located position of the cursor on the display can always match that of the finger controllable member, resulting of a smooth, fast, and precise movement in operation.

4. The finger controllable member in each axis, for example X-axis, has two registers for positive directional performanc and two registers for negative directional performance. The respective value recorded in the positive and negative registers is mutual associated, so that the finger controllable member may return to its original point and the cursor on the display may also return to its original point.

The various symbols used in the control program flow chart are defined in TABLE II as follows:

TABLE II

VX represents the operating speed of the finger controllable member, and also provides a predetermined value as a reference value for speed determination.
V(n) represents the different moving speed of the finger controllable member and the setting of speed level reference value.
C1 represents the maximum displacement of the finger controllable member at minimum speed level.
C2 represents the maximum displacement of the finger controllable member at second speed level.
C3 represents the combined displacement of the finger controllable member, C1+C2=C3.
K(n) represents various reference constants at different speed level and the mutual relationship of various speeds of the finger controllable member.
V(n)X(n) represents the displacement of the finger controllable member at different speed level.
V1X1+reg is a register for registering the displacement of the finger controllable member in positive direction at lowest speed level.
V2X2+reg is a register for registering the displacement of the finger controllable member in positive direction at the second speed level.
V1X1−reg is a register for registering the displacement of the finger controllable member in negative direction at lowest speed level.
V2X2−reg is a register for registering the displacement of the finger controllable member in negative direction at the second speed level.

VX represents the operating speed of the finger controllable member, and also provides a predetermined value as a reference value for speed determination.

V(n) represents the different moving speed of the finger controllable member and the setting of speed level reference value.

C1 represents the maximum displacement of the finger controllable member at minimum speed level.

C2 represents the maximum displacement of the finger controllable member at second speed level.

C3 represents the combined displacement of the finger controllable member, C1+C2=C3.

K(n) represents various reference constants at different speed level and the mutual relationship of various speeds of the finger controllable member.

V(n)X(n) represents the displacement of the finger controllable member at different speed level.

V1X1+reg is a register for registering the displacement of the finger controllable member in positive direction at lowest speed level.

V2X2+reg is a register for registering the displacement of the finger controllable member in positive direction at the second speed level.

V1X1−reg is a register for registering the displacement of the finger controllable member in negative direction at lowest speed level.

V2X2−reg is a register for registering the displacement of the finger controllable member in negative direction at the second speed level.

The formulas used in the control program flow chart are defined in TABLE III as follows:

TABLE III

Formula 1. C1+C2=C3
formula 2. Kn=(n−1)K2−(n−2)K1 n>=3, K2>K1
formula 3. (K1*C1)+((K2*C2)=the displacement of the display
formula 4. Kn*VnXn=K2*V2X2+K1*V1X1
formula 5. VnXn=V2X2+V1X1

The VX represents the moving speed of the finger controllable member, changing among at least two different moving speeds, such as V1, V2, V3, and so on. Different proportional factor K are appointed to correspond to the different moving speeds. That is, the factor K is a constant representing that the displacement of the cursor moving on the display is proportional to the detected displacement of the finger controllable member on the effective area of the positioning device. For example, factors K1 and K2 may be various combinations, such as (1,2),(1,3),(1,4),(2,4), and so on, wherein the value of K1 and K2 may be a default value as a parameter for device driver program, which is selected by the user. It is therefore possible to determine the displacements C1 and C2 with reference to formula 1 and formula listed above, at both the first speed level and the second speed level. In a preferred embodiment, C1 and C2 may be a default parameter according to the resolution of the computer display used. When the resolution of the display is increased, the scale of the constant value K2 may be increased correspondingly, so that the cursor can be moved in a fine displacement operating mode which can match the minimum pixel displacement requirements of various display resolutions. In such case, due to K2 is increased in accordance with the increment of the display resolution, the minimum pixel displacement is correspondingly decreased. As result, the movement of the cursor on the display is very smooth.

Example:
Supposing that the display resolution at X-axis of the display is 640; the displacement of the photo encoder is about 15.68 (i.e. 196*0.08 mm);
640=(1+C1)+(4*C2), K1=1, K2=4
196=C1+C2
C2=148, C1=48
In case that the display resolution at X-axis of the display is 1024;
1024=(1+C1)+(7*C2), K1=1, K2=7
196=C1+C2
C2=138, C1=58
When the display resolution is increased from 640 to 1024, the distance from pixel to pixel is decreased. So, in spite of K2 is changed from 4 to 7, it will not effect the smooth performance of the cursor moving on the display. In fine operation mode of the present invention, the cursor can be moved at precise displacement from pixel to pixel on the display, no matter the change of the display resolution. It is to be understood that the present invention can overcome the problem that the cursor move more than one sections when the finger controllable member only moves one section by decreasing the displacement C3 rather than changing the transparency of the photo encoder, comparing with the prior art, for example the section of the photo encoder is changed form 320 to 200 sections.

FIGS. 27D is a subprogram flow chart of the control program, explaining how the cursor is moved to a positive direction, while FIGS. 27E is a subprogram flow chart of the control program, explaining how the cursor is moved to the other direction, represented as H1 and H2 respectively in FIG. 27A. When the finger controllable member is moved in positive direction, the value stored in positive directional registers V1X1+reg and V2X2+reg will be increased. Correspondingly, the value stored in negative directional registers V1X1−reg and V2X2−reg will be decreased in accordance with the increment of the positive directional registers. When X-axis coordinate is minimum, the value stored in register V1X1+reg is 0, V1X1+reg is equal to value of C1, V2X2+reg is 0, and V2X2−reg is equal to value of C2; when X-axis coordinate is maximum, the value stored in register V1X1+reg is equal to value of C1, V1X1−reg is 0, V2X2+reg is equal to value of C2, and V2X2−reg is 0. The moved displacement of the finger controllable member at the third speed level is transferred to temporary values V1X1+ and V2X2+ by using formulas 4 and 5 listed in TABLE III. Thereafter, the temporary values are stored in registers V1X1+reg and V2X2+reg respectively, and then the value of reference constant K3 may be calculated by using formula 2 listed in TABLE III. After these procedures, the finger controllable member may correctly return to original position, and the cursor on the display may also correctly return to original position.

For example:

$$K1 = 1, K2 = 4$$
$$K3 = (n-1)K2 - (n-2)K1$$
$$= (3-1)4 - (3-2)1$$
$$= 7$$

The result indicates that in case the displacement of the finger controllable member is equal 1, the movement of the cursor on display will be equal to 7. Then, the displacement of the finger controllable member at the third speed level may be transferred and stored in registers V1X1+reg and V2X2+reg by using formulas 4 and 5 listed in TABLE III.

$$K3*V3X3+ = K2*V2X2+ + K1*V1X1$$
$$V3X3+ = V2X2+ + V1X1 + 7*1 = 4*V2X2+ + V1X1 +$$
$$1 = V2X2+ + V1X1 + V2X2+ = +2, V1X1+ = -1$$

It is noted, in this case, the increment of V2X2+reg is 2, and the decrement of V1X1+reg is 1.

The result indicates that the value stored in registers V2X2+reg and V1X1+reg at positive direction (i.e., V2X2+reg+V1X1+reg=2+(−1)=1) is match the real displacement of the finger controllable member at the third speed level.

Further, formula 3: (K1*C1)+(K2*C2)=the displacement of the display K1XV1X1+reg+K2VV2X2+reg=the displacement of the display that is,(1*−1)+(4*2)=7

It indicates the same result that the displacement of the cursor on display is equal to 7 when the finger controllable member is moved at the third speed level. The displacement of the finger controllable member at the third speed level is transferred into temporary values V2X2+ and V1X1+ by formulas 4 and 5 listed in TABLE III, and then the temporary values are stored in registers V2X2+reg and V1X1 +reg respectively.

It is obviously that the moving speed and positioning of the cursor on display may match that of the finger controllable member in accordance with the present invention, with advantage of smooth, fast, stable, and precise moving performance. The cursor positioning device of the present invention is provided with two positive directional registers and two negative directional registers. The value stored in the positive directional registers and the negative directional registers is always mutual associated, so that the finger controllable member may correctly return to original position and also the cursor may correctly return to original position correspondingly.

It is noted that the present invention adapts mutual association method by means of the positive directional registers and the negative directional registers. The definition of the positive directional registers and the negative directional registers is only for the purpose of better understanding. Alternatively, it is also possible to use two positive registers to achieve the same performance.

After the main program finishes the determination procedure in direction X+ as described above, the procedure determines whether VX is less than or equal to a predetermined reference speed in step F41 of FIG. 27D. If yes, it indicates the speed of the finger controllable member is less than a lower limit speed V1, i.e. the first speed level. In step F42, it further determines whether the value stored in register V1X1+reg of the first speed level is larger than or equal to a constant C1. If no, the displacement of the cursor is set to be proportional to that of the finger controllable member times a constant K1, and then in step F43 increasing the value of V1X1+reg, decreasing the value of V1X1−reg, and transmitting the value to computer. If the value stored in register V1X1+reg of the first speed level is larger than or equal to a constant C1, it indicates the V1X1+reg reaches a maximum value. In such a case, the displacement of the cursor will be set to be proportional to that of the finger controllable member times a constant K2, and then in step F46 increasing the value of V2X2+reg, decreasing the value of V2X2−reg, and transmitting the value to computer.

If the result in step F41 is no, it indicates that the finger controllable member is at an upper limit of the reference speed V1. In step F44, it further judges whether VX is at an upper limit or at a lower limit of the reference speed V2. In case VX is at an lower limit of V2, a step F45 is performed to judge whether the value stored in the register V2X2+reg is maximum value or not. If yes, the displacement of the cursor will be set to be proportional to that of the finger controllable member times a constant K1; if no, the displacement of the cursor will be set to be proportional to the displacement of the finger controllable member times a constant K2.

In case that only three speed levels are presented in the cursor positioning device, the terminal symbols A and B are combined together. In this case, if the result in step F44 is no, the step F47 is performed to read the left count remained in the positive register V2X2+reg. If the value of K2*V2X2−reg is less than that of K3, the displacement of the cursor will be set to be proportional to that of the finger controllable member times a constant K2, and then the procedure flows to step F46 to avoid a situation that the cursor value exceeds over the display margin when the performing speed of the cursor positioning device exceeds that of the reference speed V2. This also avoid a problem that the cursor does not return to original position. If the result in step F47 is no, the step F48 is performed to judge whether the register V2X2+reg is larger than or equal to a maximum value. If yes, the displacement of the cursor will be set to be proportional to that of the finger controllable member times a constant K1; if no, it indicates that the register V2X2+reg remains left value and the displacement of the finger controllable member in positive direction at the third speed level can be transferred and stored in the register V1X1+reg and V2X2+reg. Then, in step F49, the procedure judges whether the amount of fine displacement in positive direction exceeds a half of the distance. If no, step F46 is performed to set the displacement of the cursor proportional to the displacement of the finger controllable member times a constant K2; if yes, the procedure flows to step F50, decreasing the value of V1X1+reg, increasing the value of V1X1−reg, adding the value of V2X2+reg by 2, decreasing the value of V1X1−reg, and subtracting the value of V2X2−reg by 2. Under this procedure, when the finger controllable member is operating at the third speed level, the register V1X1+reg remains a value that is half of the constant C1. As result, when the cursor is moved to any position on the display, there are fine displacements always around the position where the cursor presents.

The speed parameter VX of the finger controllable member of FIG. 27D is divided into three speed levels, i.e. 0<VX<=V1, V1<VX<=V2, and VX>V2. Alternatively, the speed parameter VX may be divided into two speed levels, still remaining good performance described above and applicable to the most procedures of FIG. 27D. In this alternative embodiment, if the answer in ste F41 is no, the step F47 is performed, neglecting steps F44 and F45. It means that the speed levels V1 and V2 are set to be similar or the same value. So, the second speed level will be neglected when the finger controllable member judges the value of VX. In another embodiment, it is also possible to detect the situation of the cursor positioning device such as key switch 13a shown in FIGS. 25 and 26, with amendment to the firmware. In such a design, the user simply dicks the switch to enable the cursor positioning device operating at the first speed level. If the user clicks the switch again, the cursor positioning device can operates at the third speed level. In the third speed level, it is permitted to move the cursor on the display in fast moving operation mode.

FIGS. 27E is a subprogram flow chart of the control program, explaining how the cursor is moved to the other direction, the control flow of which is similar to that of FIG. 27D may correctly return to original position correspondingly.

Figure 29A:
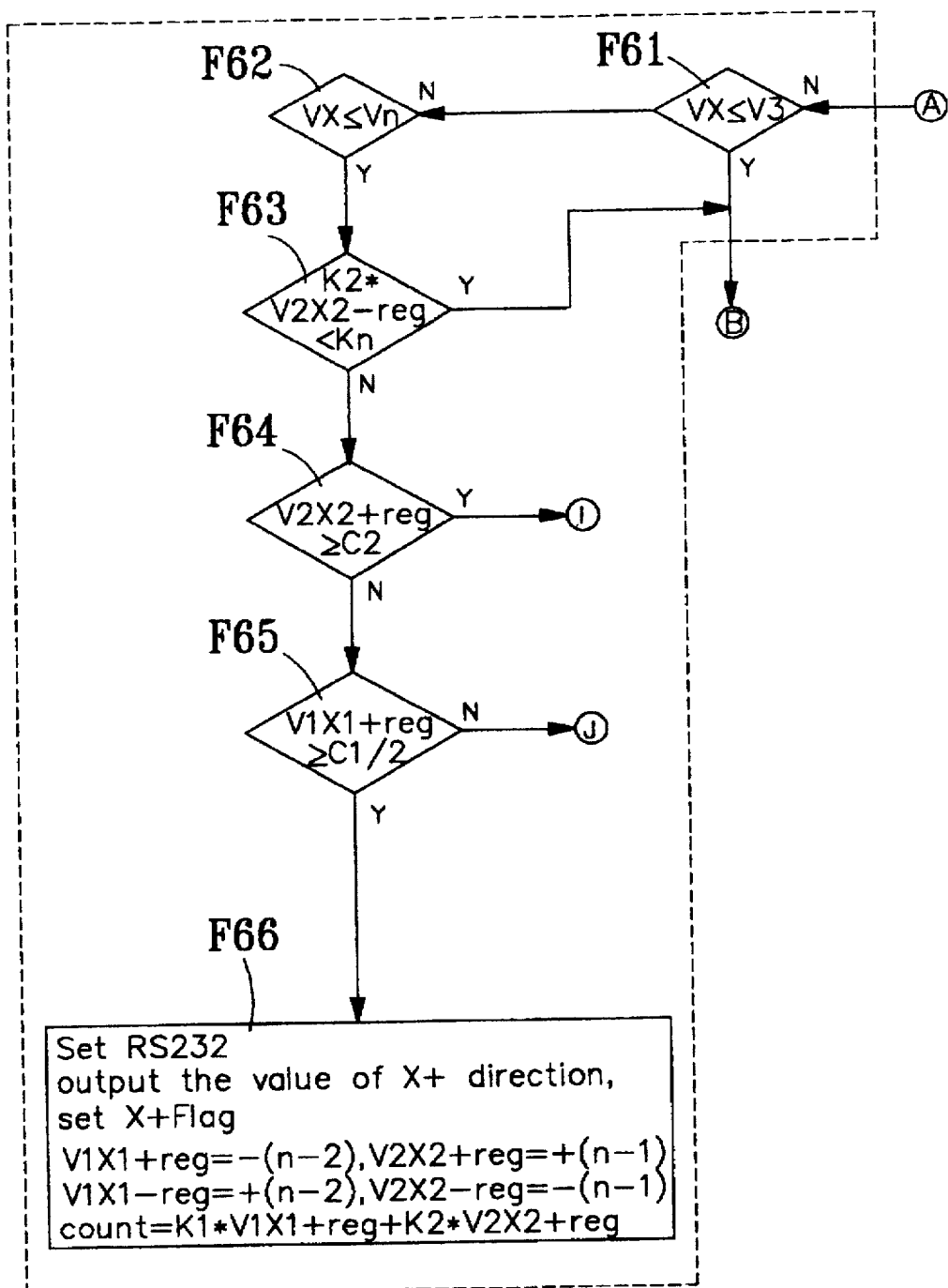
FIG. 29A is a subprogram of the block H1 of FIG. 27D and FIG. 30.
Figure 29B:
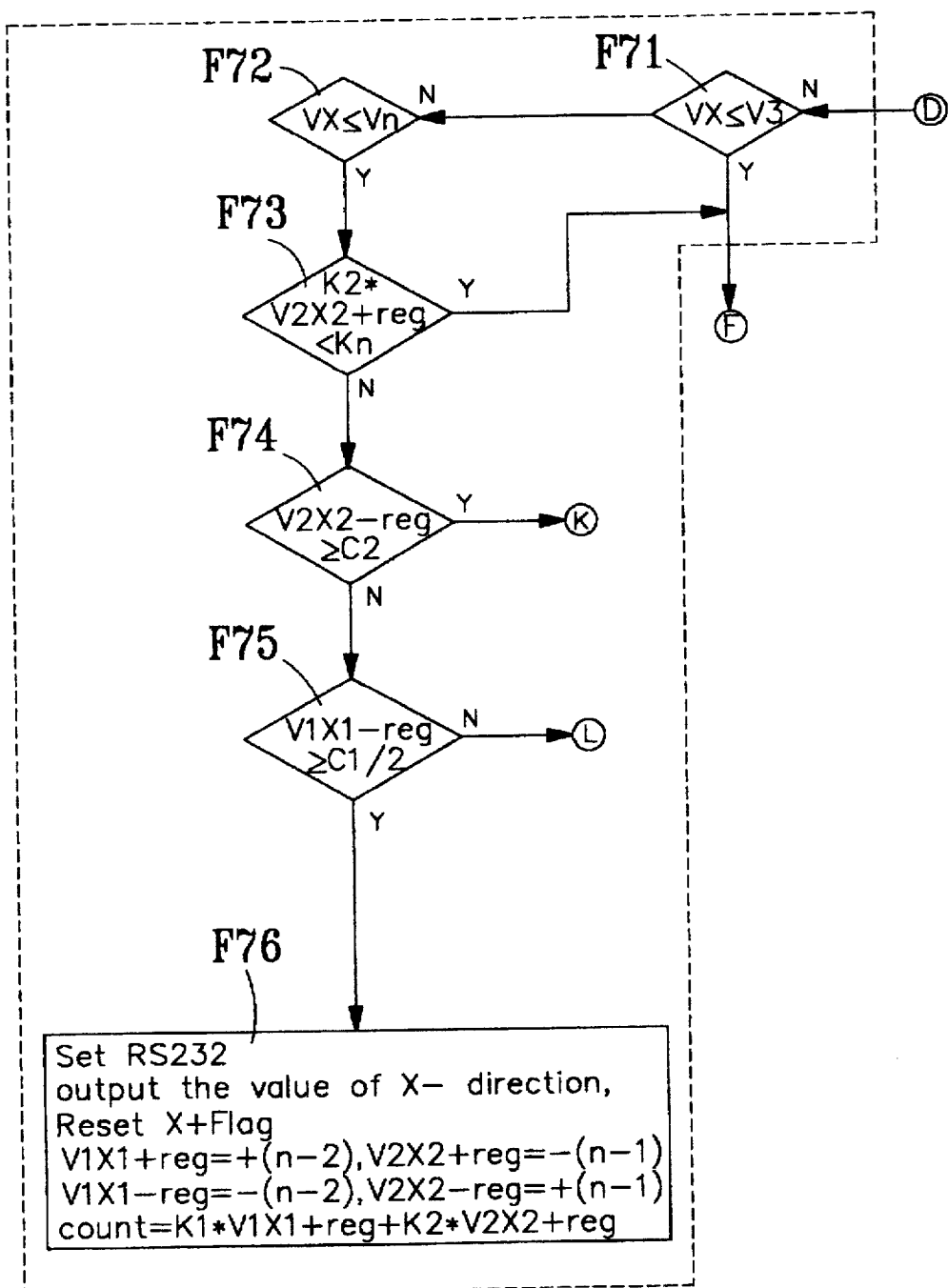
FIG. 29B is a subprogram of the block H2 of FIG. 27E and FIG. 30.

FIG. 29A is a speed detecting procedure in positive direction, including various speed detecting subprograms. The terminals A and B are connected to corresponding terminals A and B of FIG. 27D. In case that the result in step F44 is no, the procedure flows to step F61 of FIG. 29A; if the result in step F61 is yes, the procedure flows to step F47 of FIG. 27D. It is noted that the speed VX in positive direction uses the same control procedure at the third speed level, the forth speed level, and higher speed level. In step F63, it detects whether the cursor is over the margin of the display. If yes, the speed will be changed to a lower speed level to further judge whether the cursor is over the margin again. The next step F64 is performed only until the cursor does not exceed the margin. In step F64, it judges whether the register V2X2+reg is a maximum value. If yes, the procedure returns to step F43; if no, the procedure flows to step 65. In step F65, it judges whether the register V1X1+reg is larger than a half of the value C1. If no, the procedure flows to step 46; if yes, the procedure returns to step F66. At this time, the high speed value of the cursor poisoning device, for example at the third speed level or higher speed, is transferred into temporary values X2X2+ and V1X1+, and then storing the temporary values into the registers V2X2+reg and V1X1+reg respectively. As result, the moving speed and positioning of the cursor on display may match that of the finger controllable member with advantage of smooth, fast, stable, and precise moving performance. FIG. 29B is a speed detecting procedure in negative direction, the control flow of which is similar to that of FIG. 29A.

The Y-axis procedure is followed by the X-axis procedure, with similar control flow described above.

FIG. 30 is a control flow chart in connection with the embodiment using four photo transistors structure as shown in FIGS. 21A to 21F, which is similar to the embodiment shown in FIG. 27A to 27C except for the margin determination. In this embodiment, the movable photo encoder 4a includes two end mask sections 4aa and 4ab, and the photo detector may generate various pulse signals by means of four photo transistors 63c, 63a, 63b, and 63d for determining the margin. In the procedure, step F90 and step F92 are used to judge whether the minimum margin flag is set or not. Step F95 and step F97 are used to judge whether the maximum margin flag is set or not. Step F99 is used to judge whether the directional flag in X+ direction is set or not. This embodiment is designed to connect with the control circuit of FIG. 26.

Figure 28:
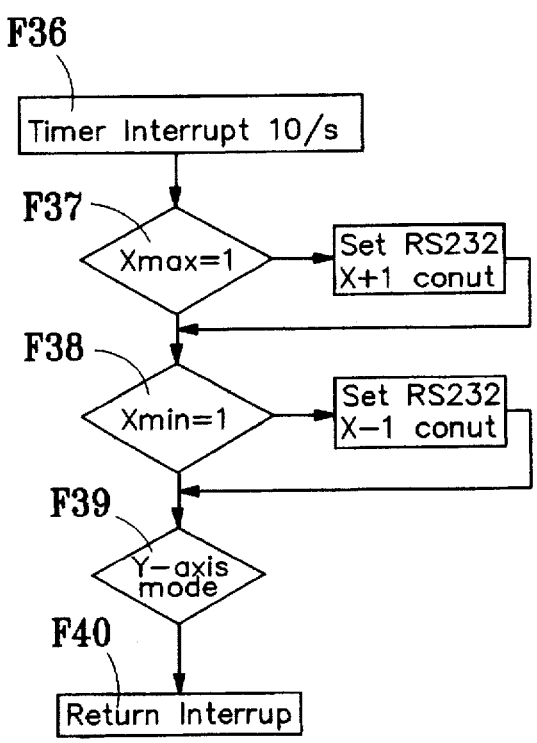
FIG. 28 is an interrupt program for margin determination.

FIG. 28 is an interrupt subprogram for margin determination. The procedure generates ten interrupt signals per second, and performs X-axis margin determination process and Y-axis margin determination process in sequence.

The arrangement and structure described above constitutes a preferred embodiment of this invention, it is to be understood that the present invention is not limited to this precise form and that changes may be made therein without departing from the scope and spirit of the invention as defined in the appended claim.

What is claimed is:

1. A cursor positioning device for control displacement and positioning of a cursor on a display of a computer device via a control circuit, said cursor positioning device comprising:

a lower housing;

an upper housing having a left switch push button, a right switch push button, and a middle switch push button, the upper housing being formed with a concave portion thereon as an effective positioning area;

a fasten wire;

a finger controllable member in a square form, composed of an upper case, a bottom case, a magnetic member, and a smooth member;

a X-axis movable photo encoder with printed patterns including a series of mask sections and transparent sections interleavingly, the encoder further having two guide extensions formed at two ends thereof;

a Y-axis movable photo encoder with printed patterns including a series of mask sections and transparent sections interleavingly, the encoder further having two guide extensions formed at two ends thereof;

a X-axis photo detector composed of an upper case, a lower case, a LED, a photo transistor, and a calibrating photo encoder attached to the surface of the photo transistor, the upper case being formed with a recess for providing a slide space for the X-axis movable photo encoder;

a Y-axis photo detector composed of an upper case, a lower case, a LED, a photo transistor, and a calibrating photo encoder attached to the surface of the photo transistor, the upper case being formed with a recess for providing a slide space for the Y-axis movable photo encoder;

an inside slidable member for fixing the X-axis photo detector, the Y-axis photo detector, the top surface of the slidable member being attached with a magnetic member and a smooth member; and a control circuit board equipped with a left switch, a right switch, and a middle switch, a control circuit being arranged on the circuit board for processing signals generated by the photo detectors and transmitting the processed signals to the computer;

wherein the finger controllable member is operationally slidable on the concave portion of the upper housing and correspondingly moves the inside slidable member by means of magnetic force between the magnetic members associated on the finger controllable member and the inside slidable member, the movement of the inside slidable member capable of moving the X-axis photo detector and the Y-axis photo detector along the X-axis movable photo encoder and the Y-axis photo encoder respectively, with operation of the left switch push button, the right switch push button, and the middle switch push button, to input X-axis and Y-axis coordinate data of displacement and positioning of the finger controllable member via the control circuit to the computer, under operation mode that the displacement of the cursor on the display is proportional to that of the finger controllable member on the effective positioning area.

2. The cursor positioning device as claimed in claim 1, wherein both the X-axis movable photo encoder and the Y-axis photo encoder are in a rectangular form with two printed pattern lines having a series of respective mask sections and transparent sections interleavely with uniform width but with 90 degrees phase deference therebetween, when each photo encoder is moved relative to the corresponding photo detector the light generated by the corresponding LED is detected by the corresponding photo detector via the corresponding photo encoder and the corresponding calibrating photo encoder, width of whose transparent sections are coordinate to those of the photo encoder, and then the photo detector generates a series of binary pulse signals and the moving direction is determined by the control circuit according to the binary pulse signals.

3. The cursor positioning device as claimed in claim 1, wherein the movable photo encoders have a phase A and a phase B and both phases are changed at the same time in determining margin when the movable photo encoders move ¼ periods distance.

4. The cursor positioning device as claimed in claim 1, wherein the inner space formed by the upper housing and the lower housing is provided with two parallel X-axis guide slots for guiding the X-axis movable photo encoder.

5. The cursor positioning device as claimed in claim 1, wherein the inner space formed by the upper housing and the lower housing is provided with two parallel Y-axis guide slots for guiding the Y-axis movable photo encoder.

6. The cursor positioning device as claimed in claim 1, wherein the movable photo encoders are attached with the corresponding calibrating photo encoders thereon in stack structure, so that the photo transistors detect a series of ON or OFF signals and avoid light diffusion of the light emitted from the LED's.

7. The cursor positioning device as claimed in claim 1, wherein a phase signal A and a phase signal B of the movable photo encoders generate a 90 degrees phase difference without need of adjusting the relative position between the photo encoders.

8. The cursor positioning device as claimed in claim 1, wherein the photo detectors comprise the upper case with the LED mounted thereon, the lower case with the photo transistor with A and B phases with the calibrating photo encoder attached to a surface of the photo transistor mounted on the lower case, and a cover plate for covering and protecting the LED and the photo transistor, the upper case being further provided with a recess for slidable containing the movable photo encoder so that a moving signal with A, B phase is detected by the photo transistor when an operation.

9. The cursor positioning device as claimed in claim 1, wherein the inside slidable member is in a form of assemble structure for connecting the X-axis photo detector and the Y-axis photo detector.

10. The cursor positioning device as claimed in claim 1, wherein the X-axis photo detector and the Y-axis photo detector are assembled as a stack structure to save installation space.

11. The cursor positioning device as claimed in claim 1, wherein the photo detectors comprise four photo transistors, the fixed calibrating photo encoder, and the movable photo encoder with single-line printed pattern and margin section capable of providing digital signal.

12. The cursor positioning device as claimed in claim 11, wherein the fixed calibrating photo encoder has a central mask section corresponding to the middle position of the LED, the width of the central mask section is 1.5 times the other mask section or transparent section of the fixed photo encoder, when the photo transistors move, the computer determines the moving direction of the movable photo encoder; the movable photo encoder being provided with mask sections at two ends thereof, the width of the mask section is two times that of the other mask section or transparent section, so that the photo transistors has same phase when the movable photo encoder does not reach margin, while the photo transistor has contrary phase when the end mask section reaches to a position between the photo transistors.

13. The cursor positioning device as claimed in claim 11, wherein the X-axis movable photo encoder comprises a LED for emitting a light beam to the photo transistors in order to detect the X-axis and Y-axis signals, the detected X-axis and Y-axis signal being sent to the control circuit for further processes; the control circuit further comprising a switch circuit consisting of a left switch, a right switch, and a middle switch; a voltage regulating circuit for supplying a stable power source; an output circuit for amplifying the output signal supplied from the processing circuit and then supplying the amplified output signal to the computer via a transmission line.

14. The cursor positioning device as claimed in claim 1, wherein the control circuit transmits data signal via a communication port to the computer device.

15. The cursor positioning device as claimed in claim 14, wherein the data signal is transmitted via a wireless transmitting system.

16. The cursor positioning device as claimed in claim 14, wherein the data signal is transmitted via an infrared-ray transmitting system.

17. The cursor positioning device as claimed in claim 1, wherein the control circuit comprises a X-axis photo detecting circuit and a Y-axis photo detecting circuit, in which the X-axis photo detecting circuit consists of the LED for emitting light beam and two photo transistors for generating XA and XB phase signals serving as an X-axis signal, the Y-axis photo detecting circuit consists of a LED for emitting light beam and two photo transistors for generating YA and YB phase signals serving as a Y-axis signal, the detected X-axis and Y-axis signals being sent to the control circuit for further processes, the control circuit further comprising a switch circuit consisting of the left switch, the right switch, and the middle switch; a voltage regulating circuit for supplying a stable power source; an output circuit for amplifying the output signal supplied form the processing circuit and then supplying the amplified output signal to the computer via a transmission line.

18. The cursor positioning device as claimed in claim 1, wherein the control circuit comprises two registers for the X-axis and two registers for the Y-axis of the finger controllable member to enable that the finger controllable member returns to its original position on the effective positioning area and the cursor returns to its original position on the display, under operation mode that the displacement of the cursor on the display is proportional to that of the fingercontrollable member on the effective positioning area.

19. The cursor positioning device as claimed in claim 18, wherein the displacement of the cursor on the display is controlled by the moving speed of the finger controllable member.

20. The cursor positioning device as claimed in claim 18, wherein the displacement of the cursor on the display is corresponding to the increment of the moving speed of the finger controllable member.

21. The cursor positioning device as claimed in claim 18, wherein the movement of cursor on the display is controlled by the middle switch of the switch circuit of the device.

22. The cursor positioning device as claimed in claim 1, the cursor positioning device is formed on a keyboard.

23. The cursor positioning device as claimed in claim 1, the cursor positioning device is formed on a notebook type computer device.

24. The cursor positioning device as claimed in claim 1, wherein the left control switch and the right control switch are arranged on the bottom surface of the lower housing suitable to be controllable by the index-finger and middle finger of the user respectively, and suitable to operate the finger controllable member by thumb finger for moving the cursor on the display.

25. A cursor positioning device for control displacement and positioning of a cursor on a display of a computer device via a control circuit, said cursor positioning device comprising:
a lower housing having four upward stand and two recesses for containing an X-axis and a Y-axis photo detector;
a frame having opposite bars serving as X-axis guide slot and Y-axis guide slot;
an upper housing having a left switch push button, a right switch push button, and a middle switch push button, the upper housing being formed with a concave portion thereon as an effective positioning area;
a fasten wire;
a finger controllable member in a square form, composed of an upper case, a bottom case, a magnetic member, and a smooth member;
a X-axis slide bar with a X-axis flexible photo encoder which is jointed its two ends by a rivet plate on one end section of the X-axis slide bar, and the two ends of which is formed with guide extension;
a Y-axis slide bar with a Y-axis flexible photo encoder which is jointed its two ends by a rivet plate on one end section of the Y-axis slide bar, and the two ends of which is formed with guide extension;
the X-axis photo detector is comprised of an upper case, a lower case, a LED, a photo transistor, and a calibrating photo encoder attached to the surface of the photo transistor, the upper case being formed with a recess for providing a slide space for the Y-axis flexible photo encoder;
the Y-axis photo detector is comprised of an upper case, a lower case, a LED, a photo transistor, and a calibrating photo encoder attached to the surface of the photo transistor, the upper case being formed with a recess for providing a slide space for the X-axis flexible photo encoder;
a control circuit board equipped with a left switch, a right switch, and a middle switch, a control circuit being arranged on the circuit board for processing signals generated by the photo detectors and transmitting the processed signals to the computer;
wherein the magnetic member of the finger controllable member is capable of moving the X-axis slide bar and the Y-axis slide bar to further rotate the Y-axis flexible photo encoder and the X-axis flexible photo encoder respectively, the rotation of the Y-axis flexible photo encoder and the X-axis flexible photo encoder being respectively detected by the X-axis photo detector and the Y-axis photo detector to generate a X-axis and a Y-axis coordinate data, with operation of the left switch push button, the right switch push button, and the middle switch push button, to input the X-axis and Y-axis coordinate data of displacement and positioning of the finger controllable member via the control circuit to the computer, under operation mode that the displacement of the cursor on the display is proportional to that of the finger controllable member on the effective positioning area.

26. The cursor positioning device as claimed in claim 25, wherein the flexible photo encoder is in a flat and circular form to save installation space and required operating space.

27. The cursor positioning device as claimed in claim 25, wherein the flexible photo encoder is arranged to surround two rollers which are supported by fixed pins respectively positioned on the lower housing.

28. A cursor positioning device for control displacement and positioning of a cursor on a display of a computer device via a control circuit, said cursor positioning device comprising:
a lower housing having four upward stand and two recesses for containing an X-axis and a Y-axis photo detector;
a frame having opposite bars serving as X-axis guide slot and Y-axis guide slot;
an upper housing having a left switch push button, a right switch push button, and a middle switch push button, the upper housing being formed with a X-axis guide slot and a Y-axis guide slot;
a finger controllable member in a square form, composed of an upper case, a bottom case for containing a X-axis slide bar and a Y-axis slide bar;
the X-axis photo detector is comprised of an upper case, a lower case, a LED, a photo transistor, and a calibrating photo encoder attached to the surface of the photo transistor, the upper case being formed with a recess for providing a slide space for the Y-axis flexible photo encoder;

the Y-axis photo detector is comprised of an upper case, a lower case, a LED, a photo transistor, and a calibrating photo encoder attached to the surface of the photo transistor, the upper case being formed with a recess for providing a slide space for the X-axis flexible photo encoder;

a control circuit board equipped with a left switch, a right switch, and a middle switch, a control circuit being arranged on the circuit board for processing signals generated by the photo detectors and transmitting the processed signals to the computer;

wherein the finger controllable member is operationally slidable on the upper housing and correspondingly moves a magnetic member inside the inner space formed by the upper housing and the lower housing, the movement of the magnetic member being capable of moving the X-axis slide bar and the Y-axis slide bar to further rotate the Y-axis flexible photo encoder and the X-axis flexible photo encoder respectively, the rotation of the Y-axis flexible photo encoder and the X-axis flexible photo encoder being respectively detected by the X-axis photo detector and the Y-axis photo detector to generate a X-axis and a Y-axis coordinate data, with operation of the left switch push button, the right switch push button, and the middle switch push button, to input the X-axis and Y-axis coordinate data of displacement and positioning of the finger controllable member via the control circuit to the computer, under operation mode that the displacement of the cursor on the display is proportional to that of the finger controllable member on the effective positioning area.

29. A cursor positioning device for control displacement and positioning of a cursor on a display of a computer device via a control circuit, said cursor positioning device comprising:

a lower housing;

an upper housing having a left switch push button, a right switch push button, and a middle switch push button, the upper housing being provided with a pair of X-axis guide slots;

a finger controllable member in a square form, composed of an upper case and a bottom case for containing a X-axis slide bar;

a X-axis movable photo encoder with printed patterns including a series of mask sections and transparent sections interleavingly, the encoder further having two guide extensions formed at two ends thereof;

a Y-axis movable photo encoder with printed patterns including a series of mask sections and transparent sections interleavingly, the encoder further having two guide extensions formed at two ends thereof;

a X-axis photo detector composed of an upper case, a lower case, a LED, a photo transistor, and a calibrating photo encoder attached to the surface of the photo transistor, the upper case being formed with a recess for providing a slide space for the X-axis movable photo encoder; a Y-axis photo detector composed of an upper case, a lower case, a LED, a photo transistor, and a calibrating photo encoder attached to the surface of the photo transistor, the upper case being formed with a recess for providing a slide space for the Y-axis movable photo encoder;

an inside slidable member for fixing the X-axis photo detector, the Y-axis photo detector, the top surface of the slidable member being attached with a magnetic member and a smooth member; and a control circuit board equipped with a left switch, a right switch, and a middle switch, a control circuit being arranged on the circuit board for processing signals generated by the photo detectors and transmitting the processed signals to the computer;

wherein the finger controllable member is operationally slidable on the concave portion of the upper housing and correspondingly moves the inside slidable member by means of magnetic force between the magnetic members associated on the finger controllable member and the inside slidable member, the movement of the inside slidable member capable of moving the X-axis photo detector and the Y-axis photo detector along the X-axis movable photo encoder and the Y-axis photo encoder respectively, with operation of the left switch push button, the right switch push button, and the middle switch push button, to input the X-axis and the Y-axis coordinate data of displacement and positioning of the finger controllable member via the control circuit to the computer, under operation mode that the displacement of the cursor on the display is proportional to that of the finger controllable member on the effective positioning area.

* * * * *